United States Patent
Tayama et al.

(10) Patent No.: US 6,477,833 B2
(45) Date of Patent: Nov. 12, 2002

(54) ENGINE EXHAUST EMISSION CONTROL

(75) Inventors: Akira Tayama, Yokosuka (JP);
Hirofumi Tsuchida, Yokosuka (JP);
Toshikazu Shiino, Chigasaki (JP);
Kaname Naganuma, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/855,704

(22) Filed: May 16, 2001

(65) Prior Publication Data

US 2001/0054283 A1 Dec. 27, 2001

(30) Foreign Application Priority Data

Jun. 26, 2000 (JP) ........................................ 2000-190965

(51) Int. Cl.[7] .................................................. F01N 3/00
(52) U.S. Cl. ............................ 60/285; 60/274; 60/276
(58) Field of Search ......................... 60/274, 276, 285, 60/286, 295; 123/295

(56) References Cited

U.S. PATENT DOCUMENTS

| | | | | |
|---|---|---|---|---|
| 5,956,942 A | * | 9/1999 | Sebastiano et al. | 60/285 |
| 5,974,788 A | * | 11/1999 | Hepburn et al. | 60/274 |
| 6,101,809 A | * | 8/2000 | Ishizuka et al. | 60/285 |
| 6,119,452 A | * | 9/2000 | Kinugasa et al. | 60/285 |
| 6,244,046 B1 | * | 6/2001 | Yamashita | 60/285 |
| 6,244,047 B1 | * | 6/2001 | Brehob et al. | 60/285 |
| 6,336,320 B1 | * | 1/2002 | Tanaka et al. | 60/285 |

FOREIGN PATENT DOCUMENTS

| | | |
|---|---|---|
| DE | 197 44 409 | 4/1999 |
| DE | 198 44 082 | 10/1999 |
| DE | 199 18 909 | 10/1999 |
| EP | 0 867 604 | 9/1998 |
| JP | 11-62563 | 3/1999 |

* cited by examiner

*Primary Examiner*—Thomas Denion
*Assistant Examiner*—Tu M. Nguyen
(74) *Attorney, Agent, or Firm*—Foley & Lardner

(57) ABSTRACT

An upstream catalyst (12) which stores oxygen in exhaust gas and releases the stored oxygen for oxidizing a reducing agent component contained in the exhaust gas, and a downstream catalyst (13) which stores nitrogen oxides in the exhaust gas and releases the stored nitrogen oxides by reducing the stored nitrogen oxides by the reducing agent component contained in the exhaust gas, are provided in an exhaust passage (11) of an engine (2). When the storage amount of nitrogen oxides of the downstream catalyst (13) reaches a predetermined value, additional fuel is injected from a fuel injector (7) after combustion, and stored oxygen in the upstream catalyst (12) is released by the reducing agent components in the additional fuel. After release of oxygen, the supply of the additional fuel is stopped and the supply of the main fuel is increased.

9 Claims, 13 Drawing Sheets

ENGINE EXHAUST EMISSION CONTROL

FIELD OF THE INVENTION

This invention relates to an engine exhaust emission control using a nitrogen oxide purification catalyst.

BACKGROUND OF THE INVENTION

An engine operating with a fuel mixture of an air-fuel ratio in a specific lean region may generate a large amount of nitrogen oxide (NOx) in the exhaust gas. On the other hand, when the engine is operating with a fuel mixture of rich air-fuel ratio immediately after starting, it generates a large amount of hydrocarbons (HC) and carbon monoxide (CO) in the exhaust gas.

In order to purify the exhaust gas of the engine, it is necessary to oxidize HC and CO by the oxygen in the exhaust gas such that they are discharged to the atmosphere in the form of water ($H_2O$) and carbon dioxide ($CO_2$). It is also necessary to reduce NOx by HC and CO such that it is discharged to the atmosphere in the form of nitrogen ($N_2$).

In order to purify the exhaust gas of a vehicle engine that runs under a lean air-fuel ratio in the majority of running conditions, it is necessary to process NOx discharged in the aforesaid specific lean air-fuel ratio region. Tokkai Hei 11-62563 published by the Japanese Patent Office in 1999 proposes providing an oxygen storage catalytic converter and a NOx storage catalytic converter in the exhaust passage of such an engine. The NOx storage catalytic converter is provided downstream of the oxygen storage catalytic converter. The oxygen storage catalytic converter is provided with a catalyst which stores oxygen contained in the exhaust gas due to combustion of the air-fuel mixture of a lean air-fuel ratio, and discharges oxygen stored according to decrease of the oxygen concentration in the exhaust gas. The NOx storage catalytic converter is provided with a catalyst which stores NOx contained in the exhaust gas due to combustion of the air-fuel mixture of a lean air-fuel ratio range, and reduces and discharges NOx by a reducing agent component such as HC and CO in the exhaust gas which increase according to decrease of the oxygen concentration in the exhaust gas.

Further, in this prior art device, it is proposed to make the reducing agent component of the exhaust gas increase by supplying additional fuel to the engine after the combustion by ignition is performed by the spark plug of the engine, so as to decrease the NOx storage amount of the NOx storage catalyst and increase the NOx storage capability when the NOx storage amount of the NOx storage catalyst reaches an upper limit. The regeneration of the NOx catalyst by the control of air-fuel ratio in this way is known as NOx catalyst regeneration control.

SUMMARY OF THE INVENTION

When unburnt fuel mixes with the combustion gases, it vaporizes and reforms, and the reactivity with NOx is enhanced.

However, when supplying additional fuel after the combustion, it is difficult to keep the vaporizing/reforming state constant, and a large amount of reducing agent component having low reactivity with NOx may be discharged into the air.

On the other hand, it is also possible to increase the fuel supply amount for the combustion so as to increase the reducing agent concentration in the exhaust gas. In this case, although the reforming state of unburnt fuel is better than in the case where additional fuel is supplied after the combustion, the air-fuel ratio of the air-fuel mixture which bums is enriched due to the increase of the fuel supply amount. When the fuel part of the air-fuel mixture which is burnt becomes excessive, i.e., if there is too much enrichment of the air-fuel ratio, the engine will misfire, so there is a limit to how much the fuel supply amount for the combustion can be increased. If the fuel supply amount for the combustion is merely increased within this limit, regeneration of the NOx storage catalyst takes a long time.

Moreover, if a large amount of oxygen has been stored in the oxygen storage catalytic converter, it reacts with CO or HC in the exhaust gas, so the HC or CO amount flowing into the downstream NOx storage catalytic converter will not increase until the release of oxygen in the oxygen storage catalytic converter stops. Therefore, the regeneration of the NOx storage catalyst takes a long time, and since the engine has to run under a rich air-fuel ratio throughout the regeneration operation, fuel-cost performance of the engine is impaired.

It is therefore an object of this invention to perform regeneration of the NOx storage catalyst efficiently in a short time.

It is a further object of this invention to prevent discharge of noxious substances during the regeneration of the NOx storage catalyst.

In order to achieve the above objects, this invention provides a control device for such an engine that comprises a fuel supply mechanism which supplies main fuel to generate an air-fuel mixture for combustion, an exhaust passage which discharges exhaust gas generated by the combustion of the air-fuel mixture, a first catalyst disposed in the exhaust passage which stores oxygen contained in the exhaust gas and releases stored oxygen for oxidizing a reducing agent component contained in the exhaust gas, and a second catalyst disposed downstream of the first catalyst in the exhaust passage which stores nitrogen oxides in the exhaust gas and releases stored nitrogen oxides by reducing the stored nitrogen oxides by the reducing agent component contained in the exhaust gas.

The control device comprising a sensor which detects a running condition of the engine and a microprocessor programmed to calculate a storage amount of nitrogen oxides by the second catalyst based on the running condition, determine whether or not the storage amount is greater than a predetermined value, control the fuel supply mechanism to supply additional fuel to the engine after the combustion of the air-fuel mixture generated by the main fuel when the storage amount exceeds the predetermined value, determine, after a supply of the additional fuel to the engine has started, whether or not a predetermined condition is satisfied, and control the fuel supply mechanism to stop supply of the additional fuel and to increase an amount of the main fuel when the predetermined condition is satisfied.

This invention also provides a control device comprising a first mechanism for detecting a running condition of the engine, a second mechanism for calculating a storage amount of nitrogen oxides by the second catalyst based on the running condition, a third mechanism for determining whether or not the storage amount is greater than a predetermined value, a fourth mechanism for controlling the fuel supply mechanism to supply additional fuel to the engine after the combustion of the air-fuel mixture generated by the main fuel when the storage amount exceeds the predetermined value, a fifth mechanism for determining, after a supply of the additional fuel to the engine has started, whether or not a predetermined condition is satisfied, and a sixth mechanism controlling the fuel supply mechanism to stop supply of the additional fuel and to increase an amount of the main fuel when the predetermined condition is satisfied.

This invention also provides a control method comprising detecting a running condition of the engine, calculating a storage amount of nitrogen oxides by the second catalyst based on the running condition, determining whether or not the storage amount is greater than a predetermined value, controlling the fuel supply mechanism to supply additional fuel to the engine after the combustion of the air-fuel mixture generated by the main fuel when the storage amount exceeds the predetermined value, determining, after a supply of the additional fuel to the engine has started, whether or not a predetermined condition is satisfied, and controlling the fuel supply mechanism to stop supply of the additional fuel and to increase an amount of the main fuel when the predetermined condition is satisfied.

The details as well as other features and advantages of this invention are set forth in the remainder of the specification and are shown in the accompanying drawings.

DESCRIPTION OF THE PREFERRED EMBODIMENTS

Figure 1:
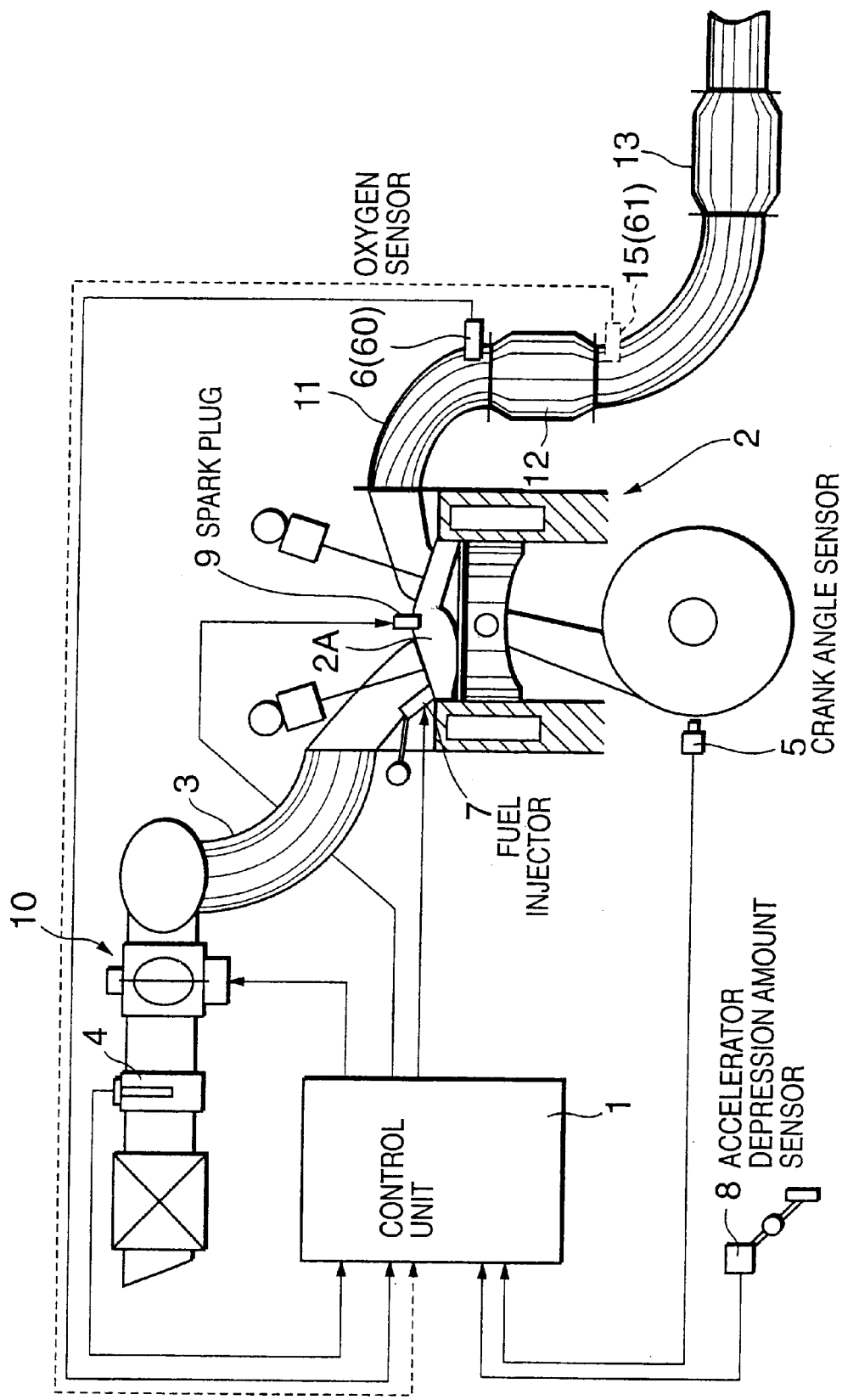
FIG. 1 is a schematic diagram of an engine comprising an exhaust emission control device according to this invention.

Referring to FIG. 1 of the drawings, a four-stroke cycle spark ignition engine 2 for a vehicle is provided with an intake passage 3 and an exhaust passage 11 which are connected to a combustion chamber 2A via a valve, respectively.

A fuel injector 7 which injects fuel into the air aspirated from the intake passage 3, and a spark plug 9 which ignites the injected fuel are provided in the combustion chamber 2A. An electronic control throttle 10 which increases and decreases the intake air flow amount and an air flow meter 4 which measures the intake air flow amount are provided in the intake passage 3.

An upstream catalytic converter 12 and downstream catalytic converter 13 are provided in series in the exhaust passage 11.

In the upstream catalytic converter 12, a catalyst comprising a platinum type noble metal and an assistant catalyst such as cerium on a honeycomb support coated with alumina is installed. This catalyst traps and stores oxygen in the exhaust gas when the oxygen concentration of the exhaust gas flowing into the upstream catalytic converter 12 is high, and discharges oxygen which was stored when the oxygen concentration of the inflow exhaust gas is low so as to oxidize reducing agent components such as HC and CO in the exhaust gas.

In the downstream catalytic converter 13, a NOx storage catalyst comprising a platinum type noble metal and alkali metal, or alkaline earth metal, supported on a honeycomb support coated with alumina, is installed. When the oxygen concentration of the exhaust gas is in a specific high oxygen concentration region, a large amount of NOx is contained in the exhaust gas. The NOx storage catalyst traps and stores NOx in the exhaust gas in such a condition, and causes the stored NOx to be reduced when the oxygen concentration in the exhaust gas is in a low oxygen concentration region where the concentration of the reducing agent components such as HC and CO is high.

In order to store and reduce NOx by the NOx storage catalyst with high efficiency, a control unit 1 controls a fuel injection amount of the fuel injector 7. The control unit 1 comprises a microcomputer comprising a central processing unit (CPU), read-only memory (ROM), random access memory (RAM) and input/output interface (I/O interface), not shown.

To perform this control, an intake air flowrate signal from the air flow meter 4, engine rotation speed signal and crank angle signal from a crank angle sensor 5, accelerator depression amount signal from an accelerator depression amount sensor 8 and an engine cooling water temperature signal from a water temperature sensor, not shown, are input to the control unit 1. The accelerator depression amount signal denotes a depression amount of an accelerator pedal with which the vehicle is provided. An oxygen sensor 6 which distinguishes whether the air-fuel ratio of the air-fuel mixture in the combustion chamber 2A is rich or lean, is provided upstream of the upstream catalytic converter 12 in the exhaust passage 11, and a rich/lean signal from the oxygen sensor 6 is also input to the control unit 1.

The control unit 1 outputs an opening signal to the throttle 10 based on the accelerator depression amount so as to adjust the intake air amount of the engine 2 according to the depression amount of the accelerator pedal. The control unit 1 also calculates a basic injection amount based on the accelerator depression amount and engine rotation speed, and adds a correction based on the cooling water temperature or rich/lean signal to the basic injection amount so as to determine the fuel injection amount of the fuel injector 7. Fuel injection is performed by outputting a duty signal corresponding to the determined injection amount to the fuel injector 7 at a timing determined according to the crank angle signal. Due to this control, the control unit 1 makes the engine run under a lean air-fuel ratio in the steady state, and under a rich air-fuel ratio in specific states such as immediately after startup or when the NOx storage amount of the NOx storage catalyst of the downstream catalytic converter 13 reaches the maximum value.

The control unit 1 also calculates the ignition timing of the spark plug 9 by correcting a basic value of the ignition timing of the spark plug 9 predefined according to the accelerator depression amount and engine rotation speed, by the cooling water temperature, etc. The air-fuel mixture in the combustion chamber 2A is ignited by supplying a firing current to the spark plug 9 from the control unit at a timing corresponding to the calculated ignition timing.

When the NOx storage amount of the NOx storage catalyst in the downstream catalytic converter 13 reaches the maximum value, the catalyst cannot store any more NOx, so NOx which is a noxious substance is discharged as it is into the atmosphere. Therefore, when the NOx storage amount reaches a predetermined value, the control unit 1 increases the reducing agent components in the exhaust gas by fuel injection control, reduces the NOx stored in the NOx storage catalyst by the reducing agent components such that the NOx are reduced and discharged as nitrogen ($N_2$) which is harmless, and thereby restores the NOx storage ability of the catalyst.

Due to this catalyst regeneration control, when additional fuel is injected after the combustion as described above (hereinafter referred to as an additional injection) the exhaust gas composition does not easily stabilize, whereas to increase the fuel injection amount for the combustion (hereinafter referred to as a main injection) it must be suppressed to be within the range of the misfiring limit of the engine 2.

In this invention, when the NOx storage amount $\Sigma$NOx reaches a predetermined value $\Sigma$NOxth, the additional injection is first performed. Specifically, the main injection is performed in the intake stroke of the four-stroke cycle comprising intake compression, expansion (combustion) and exhaust, and the additional injection is performed in the expansion stroke or exhaust stroke.

As a result, when the oxygen concentration of the exhaust gas falls, the oxygen which was stored in the oxygen storage catalyst of the upstream catalytic converter 12 is released. When release of the oxygen from the oxygen storage catalyst is complete, the control unit 1 stops the additional injection and increases the injection amount of the main injection. In this main injection mode, effectively the whole amount of the reducing agent components in the exhaust gas is supplied to the downstream catalytic converter 13, because oxygen is no longer released from the oxygen storage catalyst, and the NOx stored in the catalyst in the downstream catalytic converter 13 is efficiently reduced.

The above NOx catalyst regeneration control performed by the control unit 1 will now be described referring to the flowcharts.

Figure 2:
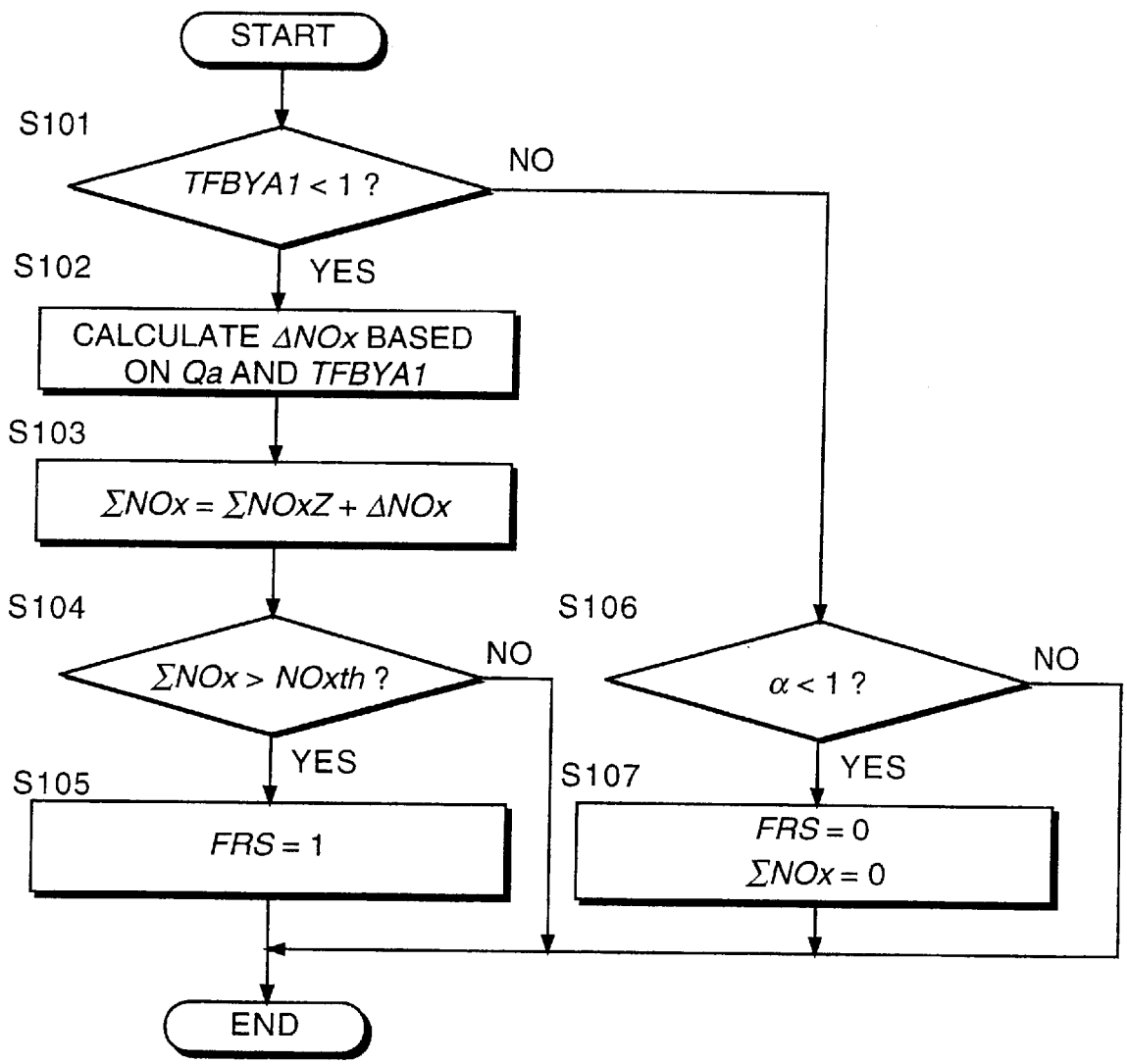
FIG. 2 is a flowchart describing a routine executed by a control unit according to this invention for determining if a catalyst regeneration is required.

FIG. 2 shows a routine for determining whether or not catalyst regeneration is required. This routine is performed at an interval of ten milliseconds during running of the engine.

First, in a step S101, the control unit 1 determines whether or not a target equivalence ratio TFBYA1 is 1.

Here, the equivalence ratio is the ratio of the stoichiometric air-fuel ratio and the air-fuel ratio of the air-fuel mixture supplied to the combustion chamber 2A. An equivalence ratio greater than 1 signifies a rich air-fuel ratio, and an equivalence ratio less than 1 signifies a lean air-fuel ratio.

The target equivalence ratio TFBYA1 is the latest value calculated by a target air-fuel ratio setting routine, described later. Hereafter, this target equivalence ratio TFBYA1 is referred to as a first target equivalence ratio.

When the target equivalence ratio TFBYA1 is less than 1, i.e. when the engine 2 is being run under a lean air-fuel ratio, the oxygen concentration of the exhaust gas flowing into the downstream catalytic converter 13 is high, and the amount of NOx it contains is large. In this case, the NOx storage catalyst traps and stores the NOx in the exhaust gas.

When the target equivalence ratio TFBYA1 is less than 1, the routine proceeds to a next step S102.

In the step S102, an NOx amount $\Delta$NOx generated by the engine 2 in unit time is calculated based on an intake air amount Qa and the first target equivalence ratio TFBYA1. For the intake air amount Qa, the latest value detected by the air flow meter 4 is used. Unit time is set equal to the execution interval of the routine.

In a next step S103, a present NOx storage amount $\Sigma$NOx is computed by adding the $\Delta$NOx calculated in the step S102 to the NOx storage amount $\Sigma$NOxZ calculated on the immediately preceding occasion the routine was executed.

In a next step S104, it is determined whether or not the present NOx storage amount $\Sigma$NOx is greater than a predetermined value NOxth. NOxth is a value corresponding to a maximum NOx storage amount at which the NOx storage catalyst can maintain good NOx storage performance. The predetermined value NOxth is found previously by experiment and is stored in the memory of the control unit 1. When the present NOx storage amount $\Sigma$NOx is larger than the predetermined value NOxth, the routine proceeds to a step S105. When the present NOx storage amount $\Sigma$NOx is larger than the predetermined value NOxth, the routine is terminated.

In the step S105, a catalyst regeneration flag FRS is set to 1 and the routine is terminated. The catalyst regeneration flag FRS is a flag to determine whether or not catalyst regeneration control should be performed, and its initial value is 0.

On the other hand, when the target equivalence ratio TFBYA1 is not less than 1 in the step S101, the routine proceeds to a step S106. Here, it is determined whether or not an air-fuel ratio feedback correction coefficient a is less than 1. The air-fuel ratio feedback correction coefficient $\alpha$ is the latest value computed by the target air-fuel ratio setting routine, described later.

When the air-fuel ratio feedback correction coefficient a is less than 1, in a next step S107, the catalyst regeneration flag FRS is set to 0, and the present NOx storage amount ΣNOx is reset to zero and the routine is terminated. When the air-fuel feedback correction coefficient α is not less than 1, the routine is immediately terminated.

Figure 3:
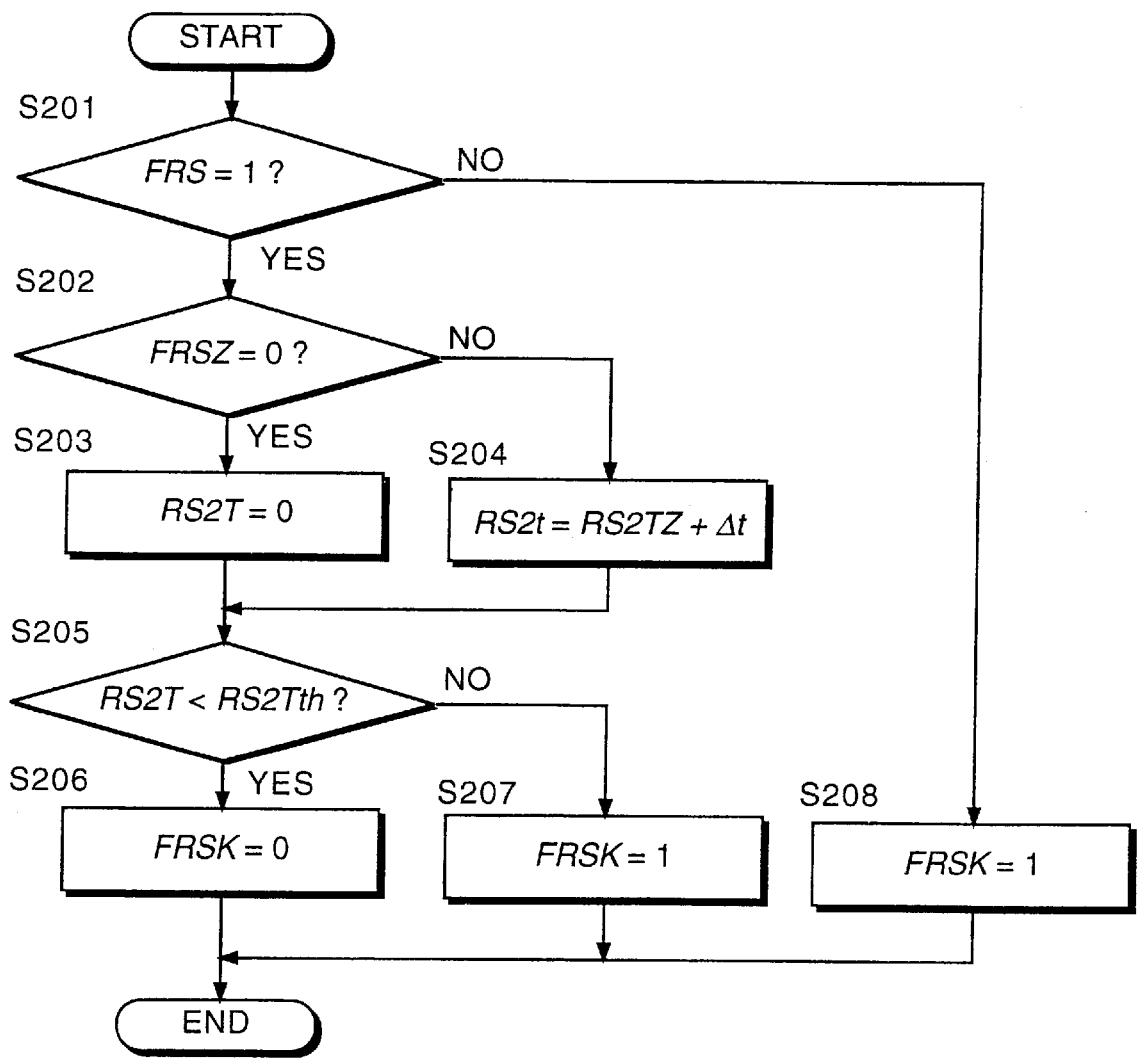
FIG. 3 is a flowchart describing a routine for setting a fuel injection mode executed by the control unit.

FIG. 3 shows a routine which selects the fuel injection mode, i.e., the aforesaid additional injection mode or the main injection mode. This routine is also executed at an interval of ten milliseconds during the running of the engine.

First, in a step S201, it is determined whether or not the catalyst regeneration flag FRS is 1. The catalyst regeneration flag FRS is the latest value which has just been set by the routine of FIG. 2. When the catalyst regeneration flag FRS is not 1 in the step S201, in a step S208, the control unit 1 sets a fuel injection mode flag FRSK to 1 and the routine is terminated.

When the catalyst regeneration flag FRS is 1, in a step S202, the control unit 1 determines whether or not an immediately preceding value FRSZ of the catalyst regeneration flag FRS is 0. The immediately preceding value FRSZ is the value of the catalyst regeneration flag FRS set on the occasion immediately preceding the latest occasion when the routine of FIG. 2 was executed, and has been stored in the memory of the control unit 1. It should be noted that the catalyst regeneration flag FRS is the value that was set on the latest occasion when the routine of FIG. 2 was executed.

When the immediately preceding value FRSZ is zero, the routine proceeds to a step S203. Here, a catalyst regeneration control continuation time RS2T is reset to 0, and the routine proceeds to a following step S205. The step S203 is executed when the catalyst regeneration flag FRS has changed from 0 to 1, i.e., when catalyst regeneration control starts.

On the other hand, when the immediately preceding value FRSZ is not 0 in the step S202, the routine proceeds to a step S204. Here, after calculating the catalyst regeneration control continuation time RS2T by adding a unit time Δt to a catalyst regeneration control continuation time RS2TZ calculated on the immediately preceding occasion the routine was executed, the routine proceeds to the step S205. The unit time Δt is set equal to the execution interval of the routine. The step S204 is performed while the catalyst recovery control flag FRS continues to be 1, i.e., while catalyst regeneration control is being performed.

In the step S205, it is determined whether or not the catalyst regeneration control continuation time RS2T is less than a predetermined value RS2Tth. The predetermined value RS2Tth is a value corresponding to the time from when additional injection begins to when all the oxygen stored in the oxygen storage catalyst of the upstream catalytic converter 12 is released. The predetermined value RS2Tth is first found by experiment, and stored in the memory of the control unit 1.

When the catalyst regeneration control continuation time RS2Tth is less than the predetermined value RS2Tth, in a step S206, the control unit 1 sets the fuel injection mode flag FRSK to 0 which shows the additional injection mode, and the routine is terminated.

When the catalyst regeneration control continuation time RS2T reaches the predetermined value RS2Tth, in a step S207, the control unit 1 sets the fuel injection mode flag FRSK to 1 which shows the main injection mode, and the routine is terminated.

Figure 4:
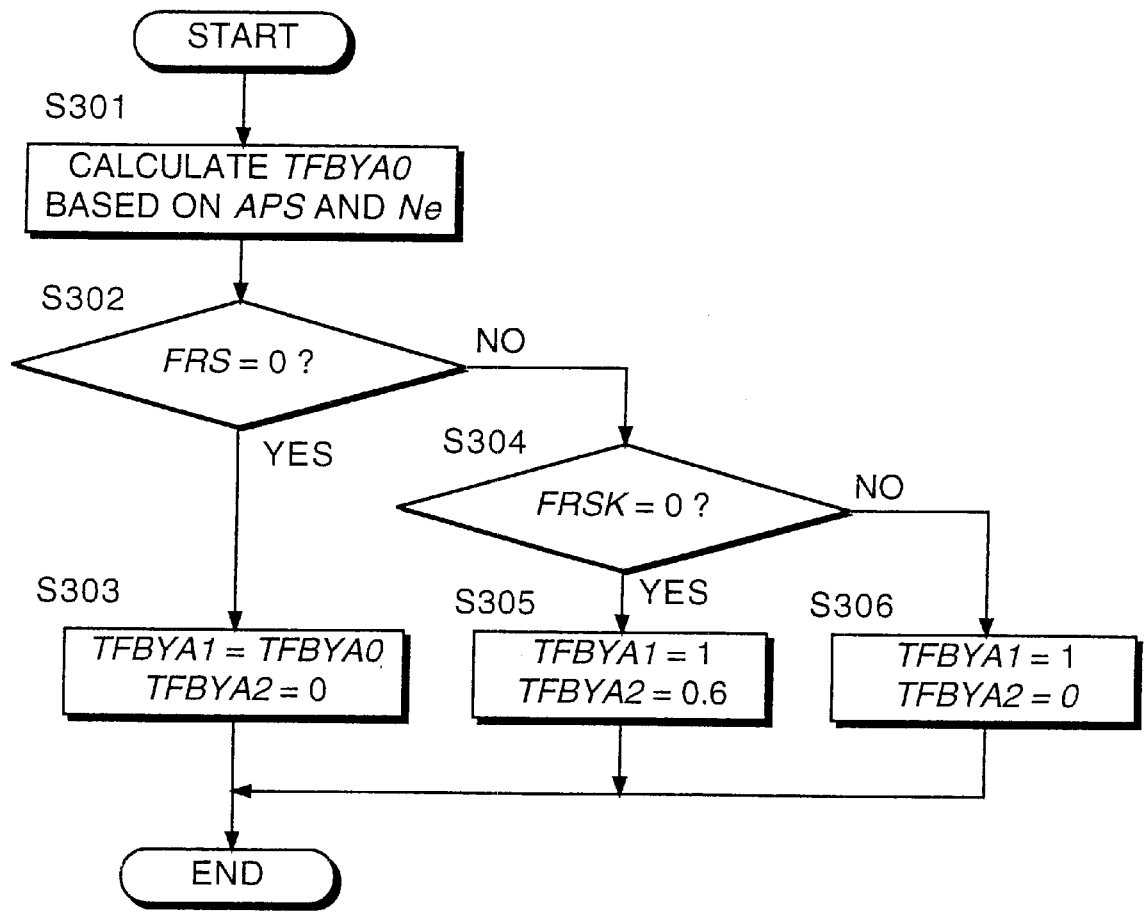
FIG. 4 is a flowchart describing a target air-fuel ratio setting routine executed by the control unit.

FIG. 4 shows a target equivalence ratio setting routine. This routine is also executed at an interval of ten milliseconds. In this routine, the control unit 1 calculates the first target equivalence ratio TFBYA1 which is the target equivalence ratio of the main injection, and a second target equivalence ratio TFBYA2 which is the target equivalence ratio of the additional injection.

First, in a step S301, the control unit 1 calculates a basic value TFBYA0 of the first target equivalent ratio by looking up a map stored in the memory based on the accelerator depression amount APS and the engine rotation speed Ne. In this map, when the accelerator depression amount APS is a value corresponding to low load or medium load, and the engine rotation speed Ne is in the low or medium rotation speed region, a value corresponding to a lean air-fuel ratio, i.e. a value less than 1, is obtained for the basic value TFBYA0 of the first target equivalence ratio.

On the other hand, when the accelerator depression amount APS is a value corresponding to high load, or when the engine rotation speed Ne is in the high rotation speed region, a value corresponding to the stoichiometric air-fuel ratio, i.e., 1, is assigned to the basic value TFBYA0 of the first target equivalence ratio.

Here, the accelerator depression amount APS and engine rotation speed Ne are the latest values detected immediately prior to execution of the routine.

In a next step S302, it is determined whether or not the catalyst regeneration flag FRS is 0. The catalyst regeneration flag FRS is the latest value set by the routine of FIG. 2 which has just been executed.

When the catalyst regeneration flag FRS is 0, i.e. when catalyst regeneration control is not performed, in a step S303, the control unit 1 sets the first target equivalence ratio TFBYA1 equal to the basic value TFBYA0 computed in the step S301, sets the second target equivalence ratio TFBYA2 to 0, and terminates the routine.

When the catalyst regeneration flag FRS is not 0 in the step S302, i.e. when catalyst regeneration control is performed, in a step S304, the control unit 1 determines whether or not the fuel injection mode flag FRSK is 0. The fuel injection mode flag FRSK is the latest value set in the routine of FIG. 3 which has just been performed.

When the fuel injection mode flag FRSK is 0, it shows that the additional injection should be performed. In this case, the routine proceeds to a step S305. Here, the first target equivalence ratio TFBYA1 is set to 1 which corresponds to the stoichiometric air-fuel ratio, the second target equivalence ratio TFBYA2 is set to 0.6 and the routine is terminated. As a result of these settings, the sum equivalence ratio of the main injection and additional injection is 1.6, and the air-fuel ratio is enriched to approximately 9:1.

On the other hand, when the fuel injection mode flag FRSK is not 0 in the step S304, it shows that the catalyst regeneration control by the main injection should be performed. In this case, the routine proceeds to a step S306. Here, the first target equivalence ratio TFBYA1 is set to 1 corresponding to the stoichiometric air-fuel ratio, the second target equivalence ratio TFBYA2 is set to 0, and the routine is terminated. In the setting of the step S306, the target air-fuel ratio is maintained at the stoichiometric air-fuel ratio, but when the step S306 is performed, i.e. when FRS=1 and FRSK=1, the air-fuel ratio is enriched by the air-fuel ratio feedback correction coefficient a described below.

The control unit 1 calculates the target generation torque of the engine 2 from the accelerator depression amount APS and engine rotation speed Ne. It then calculates the target intake air amount from the set first target equivalence ratio TFBYA1 and target generation torque, and adjusts the opening of the electronic control throttle 10 based on this target intake air amount. Therefore, even if the first target equivalence ratio TFBYA1 is set arbitrarily in this routine, the output torque of the engine does not vary.

Figure 5:
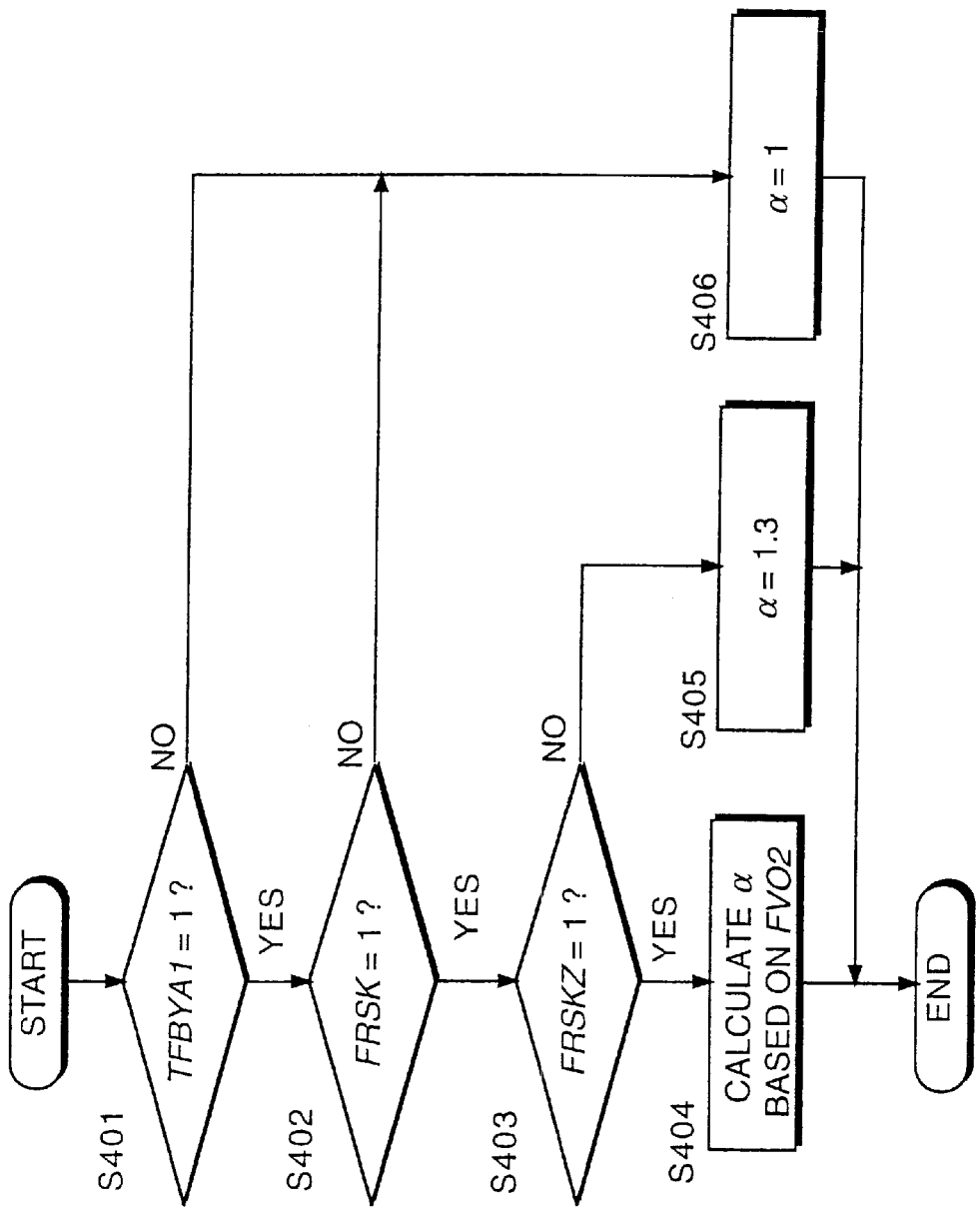
FIG. 5 is a flowchart describing a target air-fuel ratio feedback control routine executed by the control unit.

FIG. 5 shows an air-fuel ratio feedback control routine. This routine is also executed at an interval of ten milliseconds.

In this routine, the control unit 1 calculates the feedback correction coefficient α to make the equivalence ratio of the air-fuel mixture coincide with the target equivalence ratio based on the output signal of the oxygen sensor 6, and feedback corrects the equivalence ratio based on the coefficient α.

First, in a step S401, it is determined whether or not the first target equivalence ratio TFBYA1 is 1. The first target equivalence ratio TFBYA1 is the latest value set in the routine of FIG. 4 executed just beforehand. As was described for the target equivalence ratio setting routine of FIG. 4, the first target equivalence ratio TFBYA1 is always set to 1 during catalyst regeneration control. Therefore, the determining result of the step S401 is always affirmative while catalyst regeneration control is being performed. When the first target equivalence ratio TFBYA1 is not 1, i.e., when catalyst regeneration control is not being performed, in a step S406, the control unit 1 sets the feedback correction coefficient α to 1 and the routine is terminated.

On the other hand, when the first target equivalence ratio TFBYA1 is 1, in a step S402, it is determined whether or not the fuel injection mode flag FRSK is 1, i.e., in the case of the main injection mode. The fuel injection mode flag FRSK is the latest value set in the routine of FIG. 3 executed just beforehand. When the fuel injection mode flag FRSK is not 1, i.e., in the case of the additional injection mode, in a step S406, the feedback correction coefficient α is set to 1 and the routine is terminated.

In the step S402, when the fuel injection mode flag FRSK is 1, i.e., when the main injection mode is applied, in a step S403, the control unit 1 determines whether or not an immediately preceding value FRSKZ of the fuel injection mode flag FRSK is 1. The immediately preceding value FRSKZ is the fuel injection mode flag FRSK set on the occasion immediately preceding the latest occasion when the routine of FIG. 3 was executed, and is a value stored in the memory of the control unit 1.

When the immediately preceding value FRSKZ is 1, it shows that the main injection mode is continuing. In this case, in a step S404, the control unit 1 calculates the air-fuel ratio feedback correction coefficient α based on an output signal FVO2 of the oxygen sensor 6. In this calculation, the following general lambda control method is for example applied.

When a variation from rich to lean of the equivalence ratio is detected by the output signal FSVO2:

$$\alpha = \alpha Z + PL$$

where, $\alpha Z$=immediately preceding value of feedback correction coefficient α, and PL=proportional coefficient.

When a variation from lean to rich of the equivalence ratio is detected by the output signal FSVO2:

$$\alpha = \alpha Z - PR$$

where, $\alpha Z$=immediately preceding value of feedback correction coefficient α, and PR=proportional coefficient.

When the output signal FVO2 shows the equivalence ratio continues to be lean:

$$\alpha = \alpha Z + IL$$

where,

IL=integral coefficient.

When the output signal FVO2 shows the equivalence ratio continues to be rich:

$$\alpha = \alpha Z - IR$$

where,

IR=integral coefficient.

When the immediately preceding value FRSKZ of the fuel injection mode flag FRSK is not 1 in the step S403, it shows that the fuel injection mode has changed from the additional injection mode to the main injection mode. In this case, the control unit 1 sets the feedback correction coefficient α to a fixed value of 1.3 in a step S405, and the routine is terminated.

In the aforesaid step S306 of FIG. 4, the target equivalence ratio TFBYA1 was set to 1 in the main injection mode during catalyst regeneration control, however by fixing the feedback correction coefficient α at 1.3 in the step S403, the injection amount of the main injection is corrected to give a rich air-fuel ratio, and the ratio is held at approximately 11:1. This step S405 is performed only once when the additional injection mode has changed over to the main injection mode.

In this routine, the feedback correction coefficient α during catalyst regeneration control is fixed at 1 in the additional injection mode, and is initially set to 1.3 when there is a change-over from the additional injection mode to the main injection mode. Subsequently, the feedback correction coefficient α is computed as in the case of the ordinary air-fuel ratio feedback control in the step S404, but as the initial value is 1.3, only a correction towards lean is performed by α=αZ−IR for a certain time. As a result, when the feedback correction coefficient α becomes less than 1, the catalyst regeneration flag FRS is reset to 0 in the step S107 of FIG. 2, and catalyst recovery control is terminated.

Figure 6:
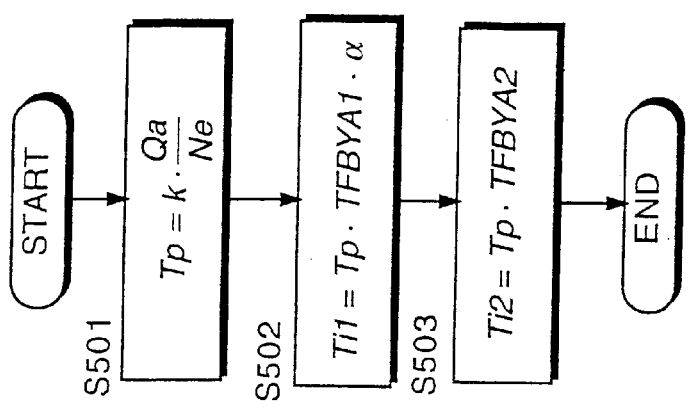
FIG. 6 is a flowchart describing a fuel injection amount computing routine executed by the control unit.

FIG. 6 shows a fuel injection amount computing routine. This routine is also executed as an interval of ten milliseconds.

In this routine, the control unit 1 calculates a fuel injection amount Ti1 of the main injection and a fuel injection amount Ti2 of the additional injection.

First, in a step S501, a basic fuel injection amount Tp is calculated based on the intake air amount Qa and engine rotation speed Ne. The basic fuel injection amount Tp is the fuel injection amount corresponding to the stoichiometric air-fuel ratio. The intake air amount Qa and engine rotation speed Ne are the latest values detected immediately beforehand.

In a next step S502, the main fuel injection amount Ti1 is computed by multiplying the basic fuel injection amount Tp by the first target equivalence ratio TFBYA1 and the feedback correction coefficient α. The first target equivalence ratio TFBYA1 is the latest value calculated in the routine of FIG. 4 executed immediately beforehand. The feedback correction coefficient α is the latest value calculated by the routine of FIG. 5 executed immediately beforehand.

In a next step S503, the additional fuel injection amount Ti2 is calculated by multiplying the basic fuel injection amount Tp by the second target equivalence ratio TFBYA2, and the routine is terminated. Here, the second target equivalent ratio TFBYA2 is the latest value calculated by the routine of FIG. 4 executed immediately beforehand. When the second target equivalent ratio TFBYA2 is set to 0, the additional fuel injection amount Ti2 is also 0.

The control unit 1 outputs a duty signal corresponding to these calculated fuel injection amounts Ti1, Ti2 at a predetermined timing to the fuel injector 7. When for example first target equivalence ratio TFBYA1 is 1, the timing of the main injection is set to the first half of the intake stroke, and when the first target equivalence ratio TFBYA1 is less than 1, it is set to the latter half of the compression stroke. The timing of the additional injection is set to approximately the middle of the expansion stroke.

Figures 7A, 7B:
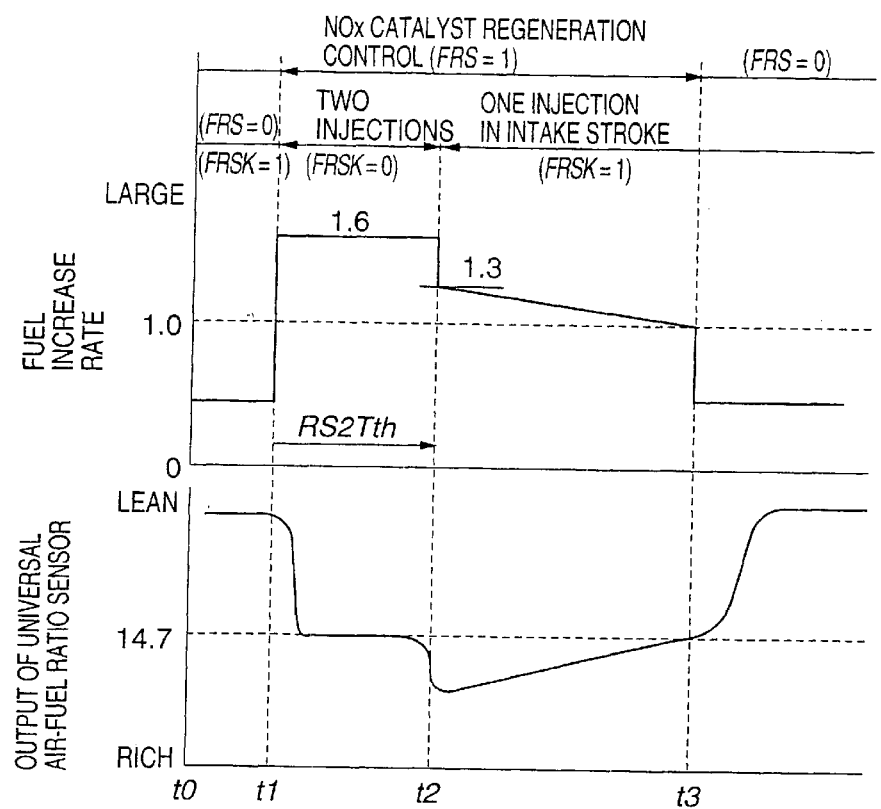
FIGS. 7A and 7B are timing charts describing the relation between a fuel injection amount and an oxygen concentration downstream of an upstream catalytic converter.

The variation of the fuel injection amount due to the execution of the above routines and the variation of the reducing agent concentration in the exhaust gas downstream of the upstream catalytic converter 12, are shown in FIGS. 7A and 7B. As shown by the dotted line in FIG. 1, the reducing agent concentration in the exhaust gas downstream of the upstream catalytic converter 12 is detected by providing a universal oxygen sensor 15 downstream of the upstream catalytic converter 12.

The universal oxygen sensor 15 is a sensor which detects the air-fuel ratio of the air-fuel mixture supplied to the combustion chamber 2A over a wide range from a rich air-fuel ratio to a lean air-fuel ratio. In the exhaust gas from burning the air-fuel mixture of lean air-fuel ratio, the oxygen concentration is high and reducing agent component concentration is low. In the exhaust gas from burning the air-fuel mixture of rich air-fuel ratio, the oxygen concentration is zero and the reducing agent component concentration is high. The universal air-fuel ratio sensor 6 detects the air-fuel ratio of the air-fuel mixture from the oxygen concentration and the reducing agent component concentration of the exhaust gas based on this type of relation between the air-fuel ratio of the air-fuel mixture and the exhaust gas composition, and outputs a corresponding air-fuel ratio signal to the control unit 1.

At a time t0, the NOx storage amount $\Sigma$NOxZ does not reach the predetermined value NOxth, the catalyst regeneration flag FRS is held at 0, and in a step S208 in the routine of FIG. 3, the fuel injection mode flag FRSK is set to 1 which shows the main injection mode. When the accelerator depression amount APS is a value corresponding to low load or medium load, and the engine rotation speed Ne is in the low or medium rotation speed region, the basic value TFBYA0 of the first target equivalence ratio calculated in the step S301 of FIG. 4 is a small value less than 1 corresponding to a lean air-fuel ratio. Also, as the first target equivalence ratio TFBYA1 is set equal to the basic value TFBYA0 in the step S303, the engine 2 is run under a lean air-fuel ratio. The NOx in the exhaust gas is trapped and stored in the NOx storage catalyst in the downstream catalytic converter 13.

When the NOx storage amount $\Sigma$NOxZ exceeds the predetermined value NOXth, the catalyst regeneration flag FRS is set to 1 in the step S105 of the routine of FIG. 2, and when the determining results of the steps S201, S202 and S205 of the routine of FIG. 3 are all affirmative, at a time t1 in a step S206, the fuel injection mode flag FRSK is set to 0 which shows the additional injection mode. As a result, additional injection is performed in the step S305 of the routine of FIG. 4. Subsequently, in the routine of FIG. 3, while the catalyst regeneration flag FRS is held at 1, counting of the catalyst regeneration control continuation time RS2T is performed in the step S204. Due to the additional injection, the fuel injection amount is increased 1.6 times the value corresponding to the stoichiometric air-fuel ratio.

As a result, the oxygen concentration in the exhaust gas decreases, but as the oxygen which was stored in the oxygen storage catalyst in the upstream catalytic converter 12 is released at this time, the exhaust gas composition downstream of the upstream catalytic converter 12 detected by the universal air-fuel ratio sensor 15 is no different from the exhaust gas due to combustion of the air-fuel mixture at the stoichiometric air-fuel ratio, as shown in FIG. 7B.

However, when the catalyst regeneration control continuation time RS2T reaches a predetermined value RS2Tth, release of oxygen by the oxygen storage catalyst is complete, and the fuel injection mode flag FRSK is set to 1 showing the main injection mode in a step S207 of FIG. 3. As a result, the target equivalence ratio TFBYA1 is set to 1 in a step S306 of the routine of FIG. 4. Also, the air-fuel ratio feedback correction coefficient a is set to 1.3 in a step S405 of the routine of FIG. 5, and the fuel injection amount is set to 1.3 times the value corresponding to the stoichiometric air-fuel ratio. Therefore, the engine 2 continues to be run under a rich air-fuel ratio within the tolerance range of the main injection.

In this state, as release of oxygen by the oxygen storage catalyst has terminated, reducing agents such as HC and CO contained in the exhaust gas due to the rich air-fuel ratio flow into the downstream catalytic converter 13 without reacting with the oxygen in the upstream catalytic converter 12. Therefore, the NOx which was stored in the NOx storage catalyst of the downstream catalytic converter 13 is efficiently reduced by these reducing agent components, and discharged as $N_2$, $H_2O$ and $CO_2$.

On the other hand, as the target equivalence ratio TFBYA1 is set to 1, the air-fuel ratio feedback coefficient a calculated in the step S404 of the routine of FIG. 5 gradually approaches 1 as air-fuel ratio feedback control is repeated, the air-fuel ratio exceeds the stoichiometric air-fuel ratio 14.7 at the time t3 and becomes lean. The NOx stored in the NOx storage catalyst is reduced during the interval from the time t2 to t3 by the reaction with the reducing agent components, and at the time t3, regeneration of the NOx storage catalyst is complete.

When the air-fuel ratio becomes lean at the time t3, the air-fuel ratio feedback correction coefficient a becomes less than 1, and as a result, the catalyst regeneration flag FRS is set to 0 in the step S107 of FIG. 2. Further, in the step S303 of FIG. 4, the first target equivalence ratio TFBYA1 is set equal to the basic value TFBYA0 computed in the step S301. As a result, the engine 2 is run under a lean air-fuel ratio identical to the air-fuel ratio prior to starting catalyst regeneration control, and the NOx in the exhaust gas is again stored in the NOx storage catalyst of the downstream catalytic converter 13.

Hence, according to this invention, the additional injection of fuel is first performed for a predetermined time at the start of catalyst regeneration control, the oxygen in the oxygen storage catalyst in the upstream catalytic converter 12 is released and the NOx catalyst is then regenerated under a rich air-fuel ratio due to the increase of the main injection amount. Consequently, the reducing agent components in the exhaust gas which increase together with the increase of the main injection amount are supplied to the downstream catalytic converter 13 without reacting with the stored oxygen in the oxygen storage catalyst in the upstream catalytic converter 12, and efficiently reduce the NOx stored in the NOx catalyst. Further, as the reducing agent components which increase together with the increase of the main injection amount are reformed by the combustion of the air-fuel mixture, they react well with NOx. Therefore, the regeneration of the NOx catalyst can be completed in a short time.

On the other hand, the reducing agent components such as HC and CO in the exhaust gas due to the additional injection react with the oxygen in the oxygen storage catalyst, and are discharged as water ($H_2O$) or carbon dioxide ($CO_2$), so the discharge amount of the reducing agent components into the atmosphere does not increase due to the additional injection.

Next, a second embodiment of this invention will be described referring to FIGS. 8–12.

In this embodiment, the oxygen storage amount due to the oxygen storage catalyst in the upstream catalytic converter 12 is calculated, and a change-over of fuel injection mode is performed according to the oxygen storage amount.

For this purpose, a universal air-fuel ratio sensor 60 is used instead of the oxygen sensor 6 of the first embodiment.

Figure 8:
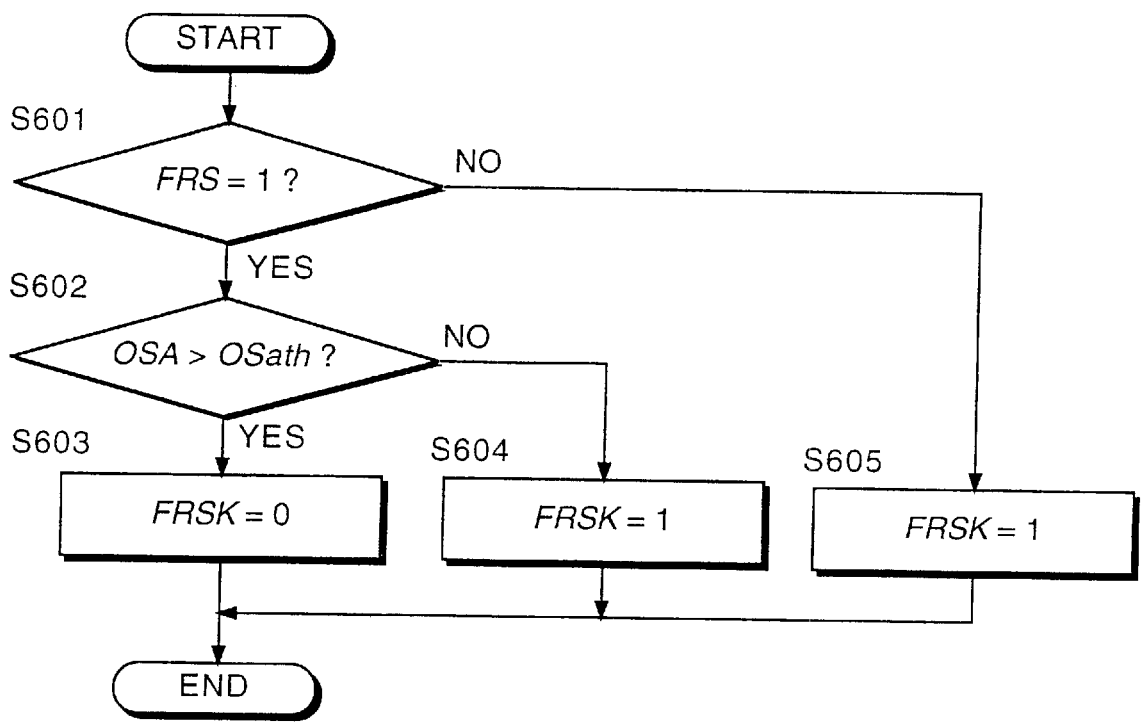
FIG. 8 is a flowchart describing a fuel injection mode setting routine executed by a control unit according to a second embodiment of this invention.

In this embodiment, the fuel injection mode is set using the routine of FIG. 8 instead of the routine of FIG. 3 of the first embodiment. This routine is also executed at an interval of ten milliseconds.

Referring to FIG. 8, first in a step S601, the control unit 1 determines whether or not the catalyst regeneration flag FRS is 1. As FRS, the latest value set in the routine of FIG. 2 for determining whether or not catalyst regeneration is required, is used When the catalyst regeneration flag FRS is not 1 in the step S601, the fuel injection mode flag FRSK is set to 1 showing the main injection mode in the step S605, and the routine is terminated. When the catalyst regeneration flag FRS is 1, the routine proceeds to a step S602.

In the step S602, it is determined whether or not a stored oxygen amount OSa of the oxygen storage catalyst in the upstream catalytic converter 12 is larger than a predetermined amount OSath.

The stored oxygen amount OSa is an oxygen storage amount of the noble metal in the oxygen storage catalyst. The calculation of the oxygen storage amount OSa is performed by a routine shown in FIG. 9 which will be described later.

Figure 9:
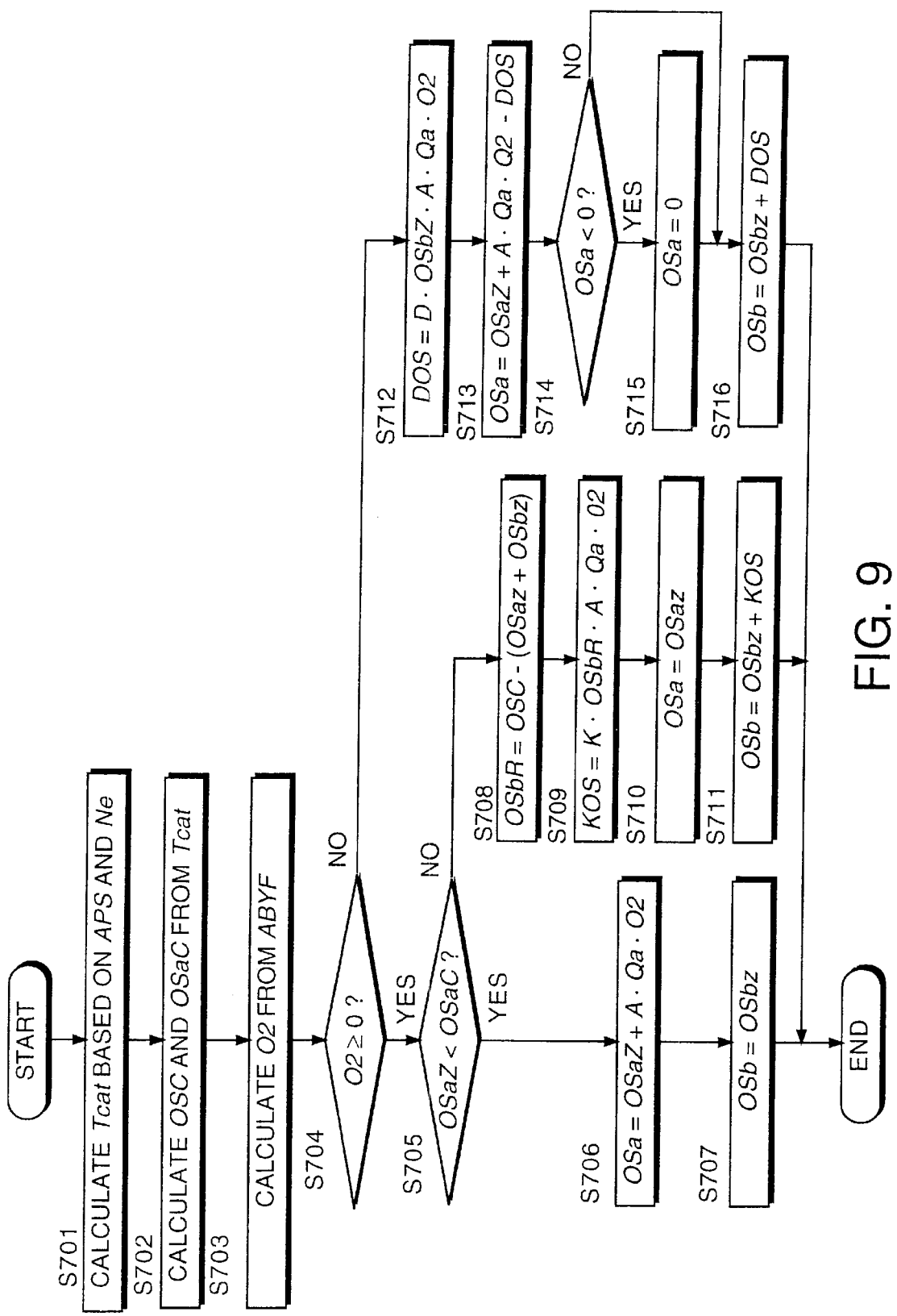
FIG. 9 is a flowchart describing an oxygen storage amount computing routine executed by the control unit according to the second embodiment of this invention.

In the step S602, the calculation result of the routine of FIG. 9 executed on the immediately preceding occasion is used as the stored oxygen amount OSa.

The predetermined value OSath is the oxygen amount required to oxidize the increase amount of reducing agent components flowing into the upstream catalytic converter 12 in the additional injection mode.

Therefore, when the stored oxygen amount OSa is less than the predetermined value OSath, and additional injection is performed, part of the reducing agent components flow through the upstream catalytic converter 12 directly into the downstream catalytic converter 13.

In this routine, when the oxygen amount OSa is larger than the predetermined amount OSath in the step S602, the fuel injection mode flag FRSK is set to 0 showing the additional injection mode in a step S603. When the adsorbed oxygen amount OSa is not larger than the predetermined amount OSath in the step S602, the fuel injection mode flag FRSK is set to 1 showing the main injection mode in a step S604. The predetermined value OSath is found experimentally, and it is stored beforehand in the memory of the control unit 1.

FIG. 9 shows a routine for calculating the stored oxygen amount OSa and an stored oxygen amount OSb of the oxygen storage catalyst in the upstream catalytic converter 12. This routine is also executed at an interval of ten milliseconds. There are generally two mechanisms whereby oxygen is held in the oxygen storage catalyst. In one mechanism, oxygen is adsorbed by the noble metal used in the oxygen storage catalyst, and the storage of oxygen takes place almost instantaneously. In the other mechanism, the oxygen is absorbed by an oxygen storage medium such as cerium oxide used for the substrate of the oxygen storage catalyst. In this form of storage, the oxygen is stored slowly.

In this routine, the oxygen storage amount OSa due to adsorption and the oxygen storage amount OSb due to absorption are calculated separately.

However, to simplify the calculation, the oxygen storage mechanism of the catalyst is regarded as follows.

(A) When the engine 2 is running under a lean air-fuel ratio, the storage of oxygen in the oxygen storage catalyst first takes place by adsorption by the noble metal and after the adsorption amount reaches an upper limit, absorption via the oxygen storage material occurs. When the oxygen inflow amount per unit time exceeds the absorption amount per unit time that can be performed by the oxygen storage material, the excess oxygen amount flows into the downstream catalytic converter 13 without being stored by the oxygen storage catalyst.

(B) When the engine 2 is running under a rich air-fuel ratio, the oxygen storage catalyst releases the stored oxygen into the exhaust gas flowing into the upstream catalytic converter 12, and the reducing agent components contained in the exhaust gas are oxidized. At this time, the oxygen absorbed by the oxygen storage material is released at a certain release rate (release amount per unit time). When an inflow amount of reducing agent components per unit time exceeds the release amount of absorbed oxygen per unit time, the oxygen adsorbed by the noble metal is released to compensate for the insufficiency of oxygen. Further, when the storage amount of oxygen adsorbed by the noble metal becomes zero, reducing agent components corresponding to the insufficiency of oxygen flow into the downstream catalytic converter 13 without being oxidized.

Figure 10:
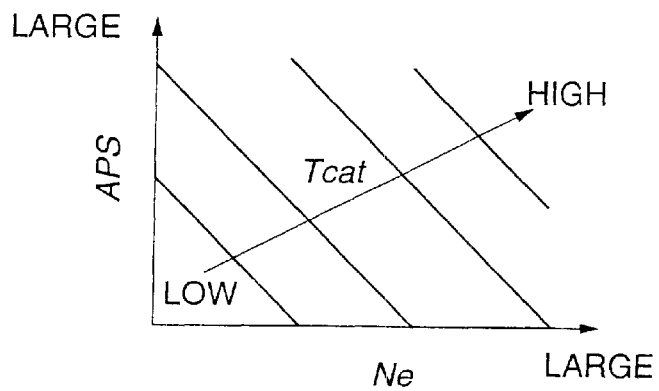
FIG. 10 is a diagram describing the contents of a map of an upstream catalyst temperature Tcat stored by the control unit according to the second embodiment of this invention.

Referring to FIG. 9, first in a step S701, the control unit 1 calculates a temperature Tcat of the oxygen storage catalyst in the upstream catalytic converter 12 by looking up a map shown in FIG. 10 stored beforehand in the memory based on the accelerator depression amount APS and engine rotation speed Ne.

Figure 11:
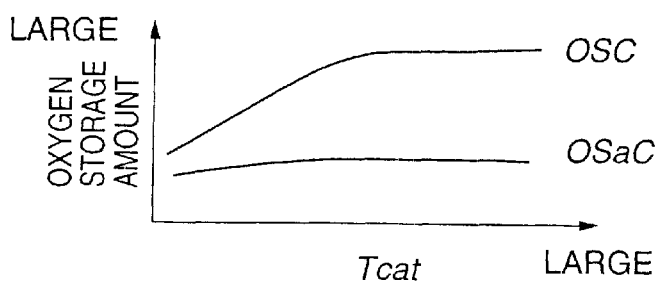
FIG. 11 is a diagram describing the contents of a map of maximum oxygen storage amounts OSC, OSaC of the upstream catalyst stored by the control unit according to the second embodiment of this invention.

In a next step S702, saturation amounts OSC, OSaC of the oxygen storage amount in the oxygen storage catalyst are calculated by looking up a map shown in FIG. 11 stored beforehand in the memory based on the catalyst temperature Tcat. Here, OSC is the saturation amount of the total oxygen storage amount of the oxygen storage catalyst combining the adsorbed oxygen and absorbed oxygen, and OSaC is the saturation amount of the adsorbed oxygen amount. The saturation amounts OSC, OSac vary together with the deterioration of the catalyst, so if the saturation amounts OSC, OSaC are calculated using the degree of catalyst deterioration as a parameter, the saturation amounts can be calculated with even higher precision.

Figure 12:
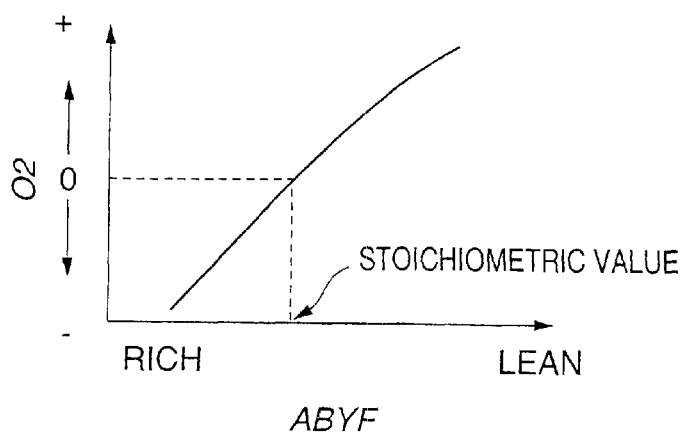
FIG. 12 is a diagram describing the contents of a map of an excess/insufficiency oxygen concentration O2 of fresh air flowing into the upstream catalyst stored by the control unit according to the second embodiment of this invention.

In a next step S703, the excess/insufficiency oxygen concentration O2 is calculated by looking up a map shown in FIG. 12 stored beforehand in the memory based on an air-fuel ratio ABYF of the air-fuel mixture supplied to the engine 2. The air-fuel ratio ABYF is detected by the universal air-fuel ratio sensor 60. The excess/insufficiency oxygen concentration O2 is a value showing the oxygen concentration of the exhaust gas flowing into the upstream catalytic converter 12, and takes positive and negative values. Specifically, the oxygen amount remaining after the oxygen in the exhaust gas has reacted with reducing agent components such as HC, CO, is represented as a positive concentration. Under a rich air-fuel ratio, even after all the oxygen in the exhaust gas has reacted with the reducing agent components, some reducing agent components remain. The amount of oxygen required to oxidize the remaining reducing agent components is represented as a negative concentration. As shown in FIG. 12, at the stoichiometric air-fuel ratio, the excess/insufficiency oxygen concentration O2 is zero. The excess insufficiency oxygen concentration O2 varies in an effectively linear fashion relative to the air-fuel ratio ABYF as shown in FIG. 12.

In a next step S704, it is determined whether or not the excess/insufficiency option concentration O2 is zero or positive. When the excess/insufficiency oxygen concentration O2 is zero or positive, the routine proceeds to a step S705, and when the excess/insufficiency oxygen concentration O2 is negative, the routine proceeds to a step S712.

In the step S705, an adsorbed oxygen amount OSaZ calculated on the immediately preceding occasion the routine was executed is compared with the saturation amount OSaC of the adsorbed oxygen calculated in the step S702. When the immediately preceding value OSaZ of the adsorbed oxygen amount is less than the saturation amount OSac, the adsorbed oxygen amount of the oxygen storage catalyst is not saturated. In this case, the routine proceeds to a step S706. When the immediately preceding value OSaZ of the adsorbed oxygen amount is not less than the saturation amount OSac, i.e., when the adsorbed oxygen amount OSa has reached the saturation amount OSaC, the routine proceeds to a step S708.

In the step S706, the adsorbed oxygen amount OSa is calculated by the following equation (1).

$$OSa=OSaZ+A\cdot Qa\cdot O2 \quad (1)$$

where,

OSaZ=adsorbed oxygen amount OSa on the immediately preceding occasion the routine was executed, O2=excess/insufficiency oxygen concentration, Qa=intake air amount, and A=conversion coefficient.

In equation (1), A·Qa·O2 represents the excess/insufficiency oxygen amount per unit time. Herein, unit time is taken as ten milliseconds which is the execution interval of the routine. The conversion coefficient A includes a value for unit time conversion. For the intake air amount Qa, the latest value detected by the air flow meter 4 is used.

In a next step S707, the absorbed oxygen amount OSb is set equal to an absorbed oxygen amount OSbZ calculated on the immediately preceding occasion the routine was executed, and the routine is terminated.

When the absorbed oxygen storage amount is not saturated, storage of oxygen by the oxygen adsorption catalyst takes place only by the adsorption by the noble metal and the absorption of oxygen by the oxygen storage material does not occur, so the absorption oxygen amount OSb does not vary.

On the other hand, in the determination of the step S705, when the adsorbed oxygen amount OSaZ is equal to or greater than the saturation amount OSaC, in a step S708, the control unit 1 calculates an oxygen amount OSbR which can still be stored by the following equation (2).

$$OSbR=OSC-(OSaZ+OSbZ) \quad (2)$$

In equation (2), (OSAZ+OSbZ) shows the present oxygen storage amount of the oxygen storage catalyst.

In a following step S709, an absorbed oxygen amount KOS of the storage material per unit time is calculated by the following equation (3). Unit time is taken as ten milliseconds which is the execution interval of the routine.

$$KOS=K\cdot OSbR\cdot A\cdot Qa\cdot O2 \quad (3)$$

where,

K=coefficient representing the oxygen absorption rate of the oxygen storage material.

In a next step S710, the adsorbed oxygen amount OSa of the oxygen storage catalyst is set equal to the value OSaZ calculated on the immediately preceding occasion the routine was executed. This is because the adsorbed oxygen amount is already saturated.

In a next step S711, the latest absorption oxygen amount OSb is calculated by adding the adsorbed oxygen amount KOS per unit time to the immediately preceding value OSbZ of the absorbed oxygen amount, and the routine is terminated.

On the other hand, in the step S704, when the excess/insufficiency oxygen concentration O2 is negative, oxygen is insufficient in the exhaust gas, and oxygen is released from the oxygen storage catalyst.

In this case, first, in a step S712, a release amount DOS per unit time of oxygen absorbed by the storage material is calculated by the following equation (4).

$$DOS=D\cdot OSbZ\cdot A\cdot Qa\cdot O2 \quad (4)$$

where,

D=coefficient representing the oxygen release rate of the oxygen storage material.

While oxygen is being released, the excess/insufficiency oxygen concentration O2 takes a negative value, so the release amount DOS calculated by equation (4) is also a negative value. As can be seen from equation (4), the release amount DOS of oxygen per unit time is larger, the larger the immediately preceding value OSbZ of the oxygen absorption amount by the storage material. The remaining reducing agent components which were not oxidized by release of absorbed oxygen from the storage material, vary due to release of adsorbed oxygen from the noble metal. However, when the amount of adsorbed oxygen of the noble metal becomes zero, reducing agent components are discharged downstream without being oxidized.

In a next step S713, the oxygen amount OSa adsorbed by the noble metal in the oxygen storage catalyst is calculated by the following equation (5).

$$OSa=OSaZ+A\cdot Qa\cdot Q2-DOS \quad (5)$$

As can be seen from equation (5), the release amount OSa of adsorbed oxygen by the noble metal varies according to the release amount DOS by the storage material.

In a next step S714, it is determined whether or not the adsorbed oxygen amount OSa by the noble metal is a negative value. The adsorbed oxygen amount OSa is never a negative value, so in the step S714, if it is determined that the adsorbed oxygen amount OSa is a negative value, the routine resets the adsorbed oxygen amount to zero in a step S715, and proceeds to a next step S716. If the adsorbed oxygen amount OSa is not a negative value, the routine proceeds from the step S714 to the step S716.

In the step S716, the oxygen absorption amount OSb of the storage material is calculated by adding the release amount DOS per unit time to the immediately preceding value OSbZ. The discharge amount DOS per unit time takes a negative value as described above, so the oxygen absorption amount OSb is a value less than the immediately preceding value OSbZ.

As described above, according to this embodiment, the oxygen storage amount of the upstream catalytic converter 12 is calculated separately as the adsorbed oxygen amount OSa by the noble metal and the absorbed oxygen amount OSb by the oxygen storage material.

When the NOx catalyst regeneration control is performed with the adsorbed oxygen amount OSa larger than the predetermined value OSath, the additional injection mode is selected, and when it is performed with the adsorbed oxygen amount OSa equal to or less than the predetermined value OSath, the main injection mode is selected.

In the first embodiment, when the NOx catalyst regeneration control is performed, additional injection is always performed first and the main injection is performed afterwards, but in this embodiment, the injection mode is selected according to the oxygen storage amount of the oxygen storage catalyst so that the additional injection is performed only when it is required due to a large oxygen storage amount of the oxygen storage catalyst when regeneration control of the NOx catalyst starts.

Next, a third embodiment of this invention will be described referring to FIG. 13 and FIGS. 14A–14C.

In this embodiment, a second oxygen sensor 61 is provided between the upstream catalytic converter 12 and downstream catalytic converter 13. When the NOx storage amount $\Sigma NOx$ of the downstream catalytic converter 13 reaches the predetermined value $\Sigma NOxth$, the control unit 1 first performs an additional injection, releases the oxygen stored in the upstream catalytic converter 12, changes over from the additional injection mode to the main injection mode when the air-fuel ratio detected by the second oxygen sensor 61 is rich, and continues enrichment of the air-fuel ratio.

The fuel injection mode setting routine according to this embodiment will now be described referring to FIG. 13. This routine is applied instead of the routine of FIG. 3 of the first embodiment.

First, in a step S801, the control unit 1 determines whether or not the catalyst regeneration flag FRS is 1. The catalyst regeneration flag FRS is the latest value set in the routine of FIG. 2 immediately beforehand. When the catalyst regeneration flag FRS is not 1, in a step S805, the control unit 1 sets the fuel injection mode flag FRSK to 1 showing the main injection mode, and the routine is terminated. When the catalyst regeneration flag FRS is 1, in a step S802, the control unit 1 determines whether or not the output signal RVO2 of the second oxygen sensor 61 is less than a predetermined slice level SL. The slice level SL is set to for example 500 mV corresponding to the stoichiometric air-fuel ratio.

When the output signal RVO2 of the second oxygen sensor 61 is less than the slice level SL, the oxygen storage catalyst in the upstream catalytic converter 12 is releasing oxygen, or the oxygen storage amount of the oxygen storage catalyst is not zero. In this case, in a step S803, the control unit 1 sets the fuel injection mode flag FRSK to 0 showing the additional injection mode.

On the other hand, when the output signal RVO2 of the second oxygen sensor 61 is not less than the slice level SL, in a step S804, the control unit 1 sets the fuel injection mode flag FRSK to 1, and the routine is terminated.

The remaining features of the construction are identical to those of the aforesaid first embodiment.

Figures 14A, 14B, 14C:
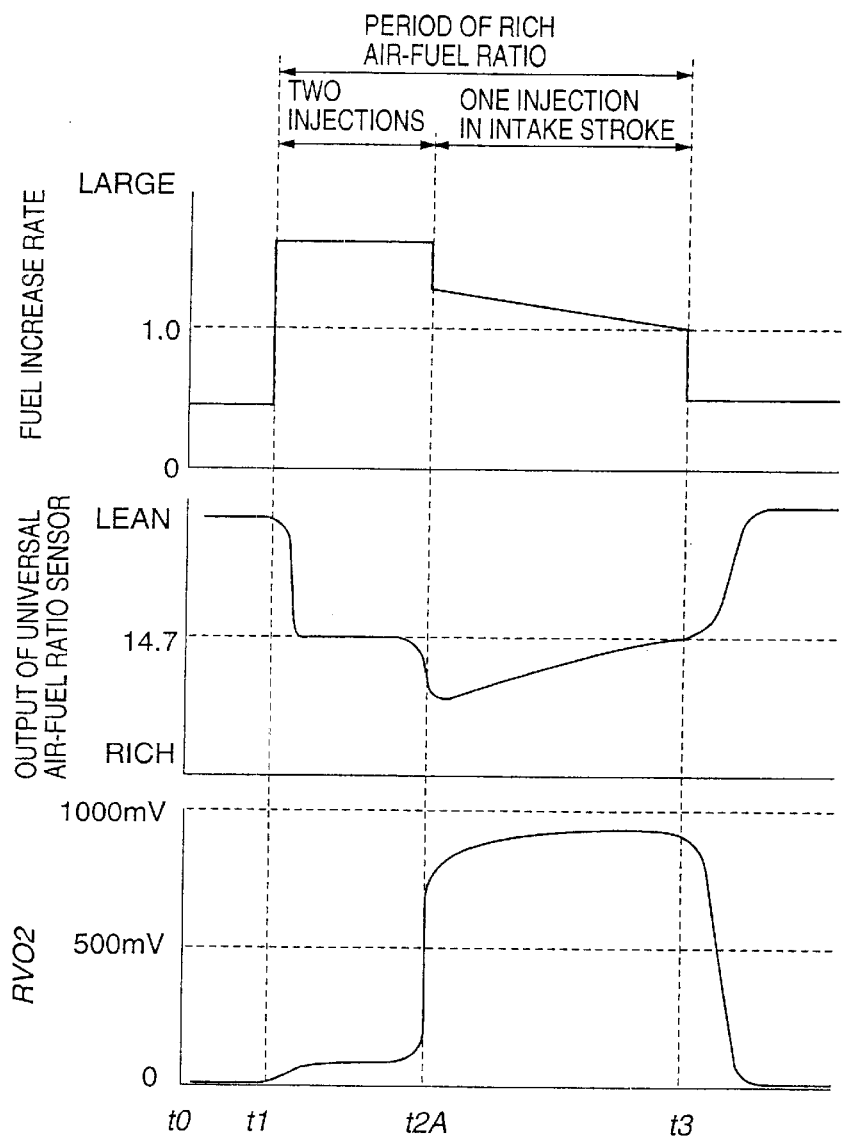
FIGS. 14A–14C are timing charts describing the relations between the fuel injection amount, the oxygen concentration downstream of the upstream catalytic converter, and the output of a downstream oxygen sensor under a control by the control unit according to the third embodiment of this invention.

Next, the relation between the fuel injection amount and air-fuel ratio detected by the second oxygen sensor 61 according to this embodiment will be described referring to FIGS. 14A–14C.

In the first embodiment, as shown in FIG. 7A, whereas the additional injection was performed for a predetermined time RS2Tth from the time t1 to t2, in this embodiment, when the output signal RVO2 of the second oxygen sensor 61 exceeds 500 mV at a time t2A after starting additional injection at the time t1, a change-over from the additional injection mode to the main injection mode is performed.

Therefore, the time period of the additional injection is not fixed as in the first embodiment, but varies according to the output signal RVO2 of the second oxygen sensor 61. FIG. 14B shows the air-fuel ratio of the air-fuel mixture detected from the exhaust gas composition downstream of the upstream catalytic converter 12. At the time t2A where the air-fuel ratio of the fuel mixture becomes rich, the output signal RVO2 of the second oxygen sensor 61 exceeds 500 mV. The control unit 1 determines at this timing that oxygen release of the oxygen storage catalyst of the upstream catalytic converter 12 has terminated. According to this invention, the fuel injection mode does not change over until the oxygen concentration of the exhaust gas downstream of the upstream catalytic converter 12 becomes zero. Therefore, it is possible that reducing agent components having low reactivity with NOx flow into the downstream catalytic converter 13 immediately prior to the injection mode change-over. However, the computing load of the control unit 1 can be reduced compared to the first and second embodiments. Further, excess/insufficiency of the additional injection in order to release all the stored oxygen in the oxygen storage catalyst can be prevented compared to the first embodiment wherein the additional injection is performed for the fixed time RS2Tth.

Next, a fourth embodiment of this invention will be described referring to FIG. 15 and FIGS. 16A–16C.

In this embodiment, the universal air-fuel ratio sensor 15 is used instead of the second oxygen sensor 61 of the third embodiment.

Figure 13:
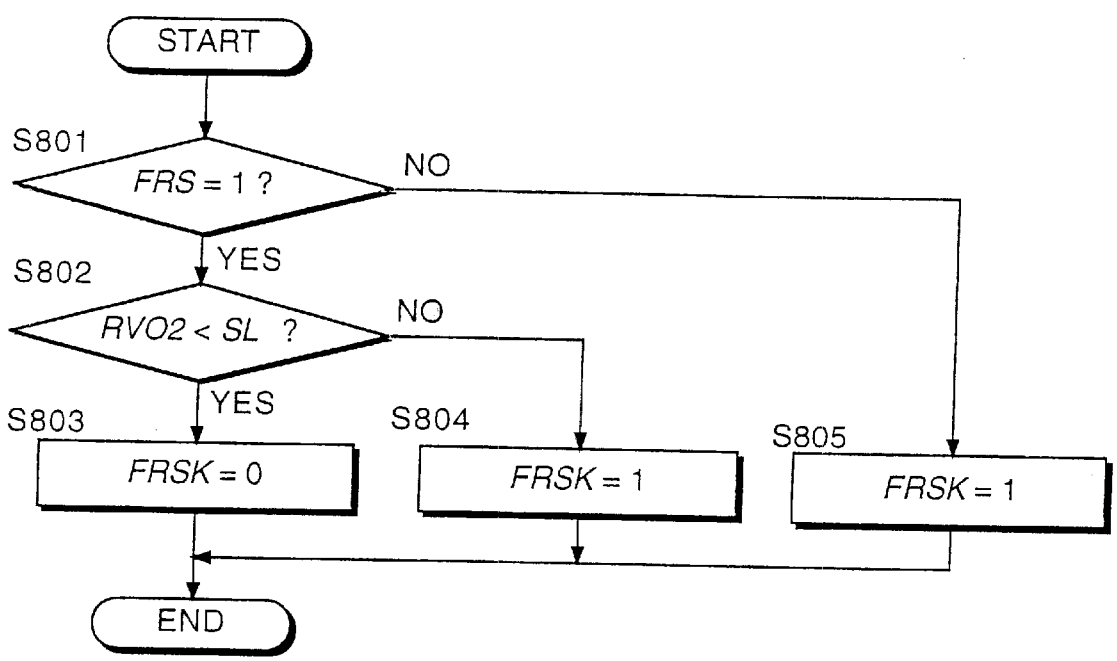
FIG. 13 is a flowchart describing a fuel injection mode setting routine executed by the control unit according to a third embodiment of this invention.
Figure 15:
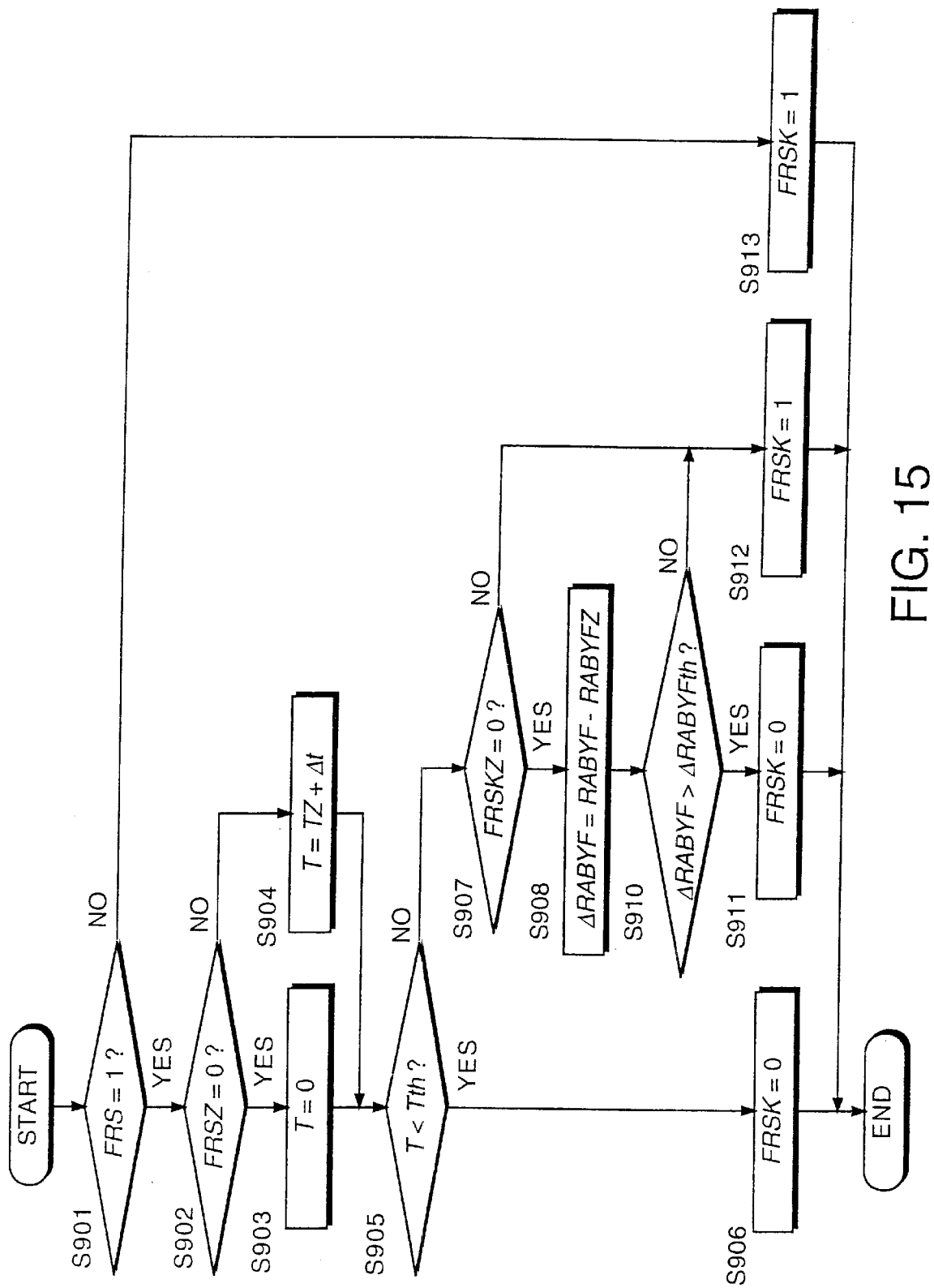
FIG. 15 is a flowchart describing a fuel injection mode setting routine executed by the control unit according to a fourth embodiment of this invention.

Also, the fuel injection mode is set using the routine of FIG. 15 instead of the routine of FIG. 13.

Referring to FIG. 15, in a step S901, the control unit 1 determines whether or not the catalyst regeneration flag FRS is 1. The catalyst regeneration flag is the latest value set in the routine of FIG. 2. When the catalyst regeneration flag FRS is not 1, in the same way as in the step S805 of the third embodiment, the fuel injection mode flag FRSK is set to 1 showing the main injection mode in a step S913, and the routine is terminated.

When the catalyst regeneration flag FRS is 1, the routine proceeds to a step S902.

In the step S902, it is determined whether or not the immediately preceding value FRSZ of the catalyst regeneration flag FRS is 0. The immediately preceding value FRSZ is the value of the catalyst regeneration flag FRS stored in the memory of the control unit 1 when the routine was performed on the occasion immediately preceding the latest occasion.

When the immediately preceding value FRSZ is 0, the routine proceeds to a step S903. Here, the catalyst regeneration control continuation time T is reset to 0, and the routine proceeds to a next step S905. The step S903 is performed when the catalyst regeneration flag FRS changes from 0 to 1, i.e., when catalyst regeneration control starts.

On the other hand, when the immediately preceding value FRS is not 0 in the step S902, the routine proceeds to a step S904. Here, after computing the catalyst regeneration control continuation time T by adding the unit time $\Delta t$ to the catalyst regeneration control continuation time T calculated on the immediately preceding occasion the routine was executed, the routine proceeds to a step S905. The unit time Δt is set equal to the execution interval of the routine i.e., ten milliseconds. This step S904 is performed while the catalyst regeneration flag FRS continues to be 1, i.e., while catalyst regeneration control continues.

In the step S905, it is determined whether not the catalyst regeneration control continuation time T is less than a predetermined value Tth. Immediately after catalyst regeneration control starts, an output ΔRABYF of the universal air-fuel ratio sensor 15 may temporarily vary towards rich. The step S905 is provided to avoid confusing this variation with completion of oxygen release from the oxygen storage catalyst. The predetermined time Tth corresponding to the confusion prevention interval is first found by experiment, and stored in the memory of the control unit 1.

When the catalyst regeneration control continuation time T is less than the predetermined value Tth in the step S905, the control unit 1, in a step S906, sets the fuel injection mode flag FRSK to 0 showing the additional injection mode, and the routine is terminated.

When the catalyst regeneration control continuation time T has reached the predetermined value Tth in the step S905, the control unit 1, in a step S907, determines whether or not the immediately preceding value FRSKZ of the fuel injection mode flag FRSK is 0. The immediately preceding value FRSKZ is the value of the fuel injection mode flag FRSK stored in the memory of the control unit 1 on the immediately preceding occasion the routine was executed.

When the immediately preceding value FRSKZ is not 0, i.e., when the immediately preceding fuel injection mode is the main injection mode, the control unit 1, in a step S912, sets the fuel injection mode flag FRSK to 1 showing the main injection mode, and the routine is terminated.

When the immediately preceding value FRSKZ is 0, in a step S908, the control unit 1 calculates a variation ΔRABYF of the air-fuel ratio conversion value RABYF, obtained by converting the output signal of the universal air-fuel ratio sensor 15 to an air-fuel ratio, as the difference between the air-fuel ratio conversion value RABYF and its immediately preceding value RABYFZ. The immediately preceding value RABYFZ is the value of the air-fuel ratio conversion value RABYF stored in the memory of the control unit 1 on the immediately preceding occasion the routine was executed. The variation amount ΔRABYF is a positive value when the output signal of the universal air-fuel ratio sensor 15 varies in the lean direction, and is a negative value when the output signal of the universal air-fuel ratio 15 varies in the rich direction.

In a following step S910, the variation amount ΔRABYF is compared with a predetermined value ΔRABYFth. The predetermined value RABYFth is set to, for example, −0.1. When ΔRABYF>ΔRABYFth is satisfied, the control unit 1, in a step S911, sets the fuel injection mode flag FRSK to 0 showing the additional injection mode, and the routine is terminated.

On the other hand, when ΔRABYF≦ΔRABYFth, the control unit 1, in a step S912, sets the fuel injection mode flag FRSK to 1 showing the main injection mode, and the routine is terminated.

The remaining features of the construction are identical to those of the third embodiment.

Figures 16A, 16B, 16C:
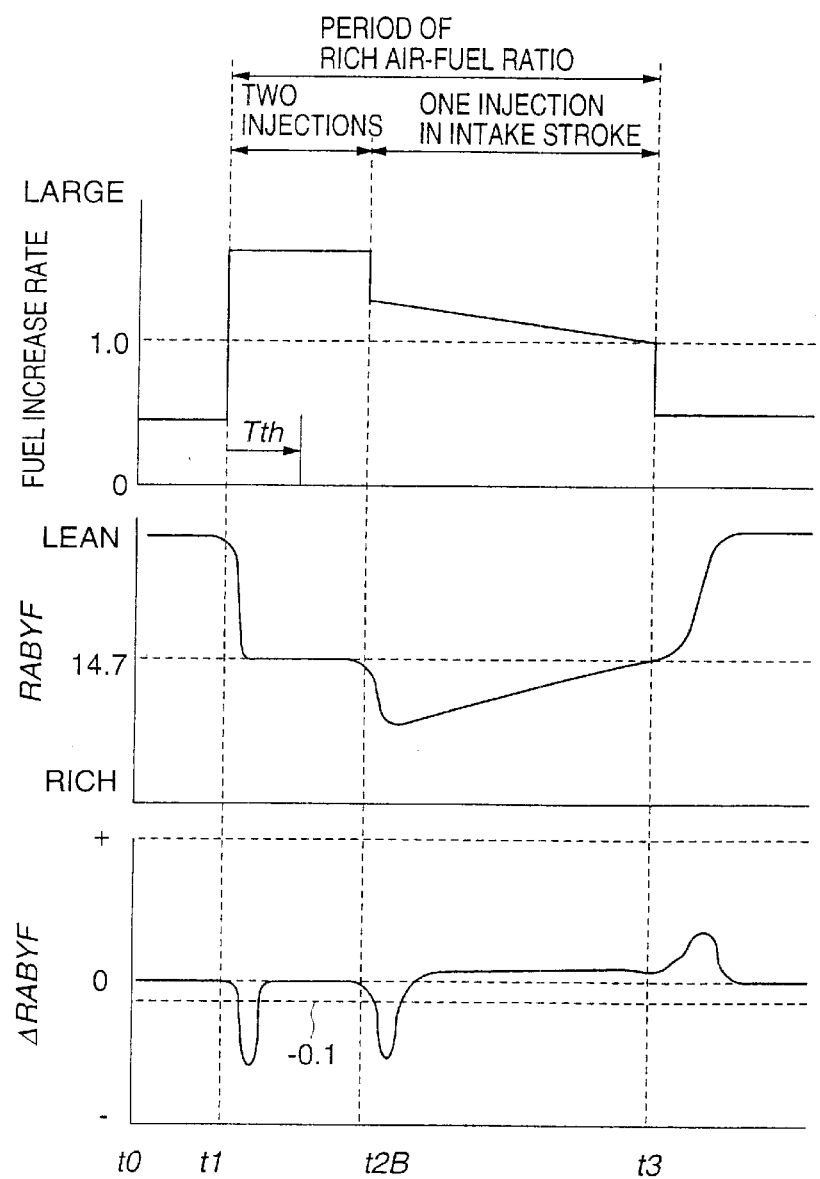
FIGS. 16A–16C are timing charts describing the relations between the fuel injection amount, the oxygen concentration downstream of the upstream catalytic converter and its variation amount, under a control by the control unit according to the fourth embodiment of this invention.

According to this embodiment, instead of performing a change-over of the fuel injection mode after the air-fuel ratio conversion value has actually become rich as in the third embodiment, the fuel injection mode is changed over when the air-fuel ratio conversion value has started to vary from the stoichiometric air-fuel ratio toward rich, as shown in FIGS. 16A–16C. In other words, the end of oxygen discharge from the oxygen storage catalyst of the upstream catalytic converter 12 can be determined earlier than in the third embodiment.

The contents of Tokugan 2000-190965, with a filing date of Jun. 26, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this invention may be applied also to an engine comprising plural exhaust passages and an exhaust manifold which combines these exhaust passages, the engine being provided with the upstream catalytic converter 12 in each of the exhaust passages, and the downstream catalytic converter 13 downstream of the exhaust gas manifold. In such an engine, regeneration control of the NOx catalyst in the downstream catalytic converter may be performed by enriching the air-fuel ratio for only one or for plural cylinders to which the exhaust passages are connected, and maintaining the air-fuel ratio for the other cylinders at the stoichiometric air-fuel ratio.

The embodiments of this invention in which an exclusive property or privilege is claimed are defined as follows:

What is claimed is:

1. A control device for an engine, the engine comprising a fuel supply mechanism which supplies main fuel to generate an air-fuel mixture for combustion, an exhaust passage which discharges exhaust gas generated by the combustion of the air-fuel mixture, a first catalyst disposed in the exhaust passage which stores oxygen contained in the exhaust gas and releases stored oxygen for oxidizing a reducing agent component contained in the exhaust gas, the first catalyst comprising a noble metal which stores oxygen and an oxygen storage material which absorbs oxygen at a lower rate than the noble metal, and a second catalyst disposed downstream of the first catalyst in the exhaust passage which stores nitrogen oxides in the exhaust gas and releases stored nitrogen oxides by reducing the stored nitrogen oxides by the reducing agent component contained in the exhaust gas, the control device comprising:

a first means for detecting a running condition of the engine;

a second means for detecting an air-fuel ratio of the air-fuel mixture;

a third means for calculating a storage amount of nitrogen oxides by the second catalyst based on the running condition;

a fourth means for determining whether or not the storage amount is greater than a predetermined value;

a fifth means for controlling the fuel supply mechanism to supply additional fuel to the engine after the combustion of the air-fuel mixture generated by the main fuel when the storage amount exceeds the predetermined value;

a sixth means for calculating an oxygen storage amount of the noble metal based on the air-fuel ratio of the air-fuel mixture;

a seventh means for determining, after a supply of the additional fuel to the engine has started, whether or not a predetermined condition is satisfied, the seventh means determining that the predetermined condition is satisfied when the oxygen storage amount of the noble metal falls below a predetermined amount; and an eighth means controlling the fuel supply mechanism to stop supply of the additional fuel and to increase an amount of the main fuel when the predetermined condition is satisfied.

2. A control method for an engine, the engine comprising a fuel supply mechanism which supplies main fuel to generate an air-fuel mixture for combustion, an exhaust passage which discharges exhaust gas generated by the combustion of the air-fuel mixture, a first catalyst disposed in the exhaust passage which stores oxygen contained in the exhaust gas and releases stored oxygen for oxidizing a reducing agent component contained in the exhaust gas, the first catalyst comprising a noble metal which stores oxygen and an oxygen storage material which absorbs oxygen at a lower rate than the noble metal, and a second catalyst disposed downstream of the first catalyst in the exhaust passage which stores nitrogen oxides in the exhaust gas and releases stored nitrogen oxides by reducing the stored nitrogen oxides by the reducing agent component contained in the exhaust gas, the control method comprising:

detecting a running condition of the engine;

detecting an air-fuel ratio of the air-fuel mixture;

calculating a storage amount of nitrogen oxides by the second catalyst based on the running condition;

determining whether or not the storage amount is greater than a predetermined value;

controlling the fuel supply mechanism to supply additional fuel to the engine after the combustion of the air-fuel mixture generated by the main fuel when the storage amount exceeds the predetermined value;

calculating an oxygen storage amount of the noble metal based on the air-fuel ratio of the air-fuel mixture;

determining, after a supply of the additional fuel to the engine has started, whether or not a predetermined condition that the oxygen storage amount of the noble metal falls below a predetermined amount is satisfied; and controlling the fuel supply mechanism to stop supply of the additional fuel and to increase an amount of the main fuel when the predetermined condition is satisfied.

3. The control device as defined in claim 2, wherein the microprocessor is further programmed to measure the elapsed time since the start of the supply of the additional fuel to the engine, and determine that the predetermined condition is satisfied when the elapsed time has reached the predetermined time.

4. The control device as defined in claim 1, wherein the control device further comprises a sensor which detects an air-fuel ratio of the air-fuel mixture, and the microprocessor is further programmed to calculate the oxygen storage amount of the first catalyst based on the air-fuel ratio of the air-fuel mixture, and determine that the predetermined condition is satisfied when the oxygen storage amount has fallen below a predetermined amount.

5. The control device as defined in claim 4, wherein the first catalyst comprises a noble metal which oxygen and an oxygen storage material which absorbs oxygen at a lower rate than the noble metal, and the microprocessor is further programmed to calculate an oxygen adsorption amount of the noble metal, and determine that the predetermined condition is satisfied when the oxygen adsorption amount of the noble metal falls below a predetermined amount.

6. The control device as defined in claim 1, wherein the air-fuel ratio sensor comprises a universal air-fuel ratio sensor which can detect a degree of leanness and richness of the air-fuel mixture and the microprocessor is further programmed to calculate the oxygen storage amount of the noble metal based on the degree of leanness.

7. The control device as defined in claim 1, wherein the control device further comprises a sensor disposed downstream of the first catalyst which detects whether or not an air-fuel ratio of the air-fuel mixture is rich or lean based on a composition of the exhaust gas, and the microprocessor is further programmed to determine that the predetermined condition is satisfied when the air-fuel ratio has changed from lean to rich.

8. The control device as defined in claim 1, wherein the microprocessor is further programmed to set an amount of the additional fuel to be larger than an increase amount of the main fuel which is increased when the predetermined condition is satisfied.

9. The control device as defined in claim 1, wherein the engine comprises a four-stroke cycle engine which performs an intake stroke, compression stroke, expansion stroke and exhaust stroke to burn the air-fuel mixture in a combustion chamber, the fuel supply mechanism comprises a fuel injector which directly injects fuel into the combustion chamber, and the microprocessor is further programmed to control the fuel injector to inject main fuel in the intake stroke, and inject additional fuel in one of the expansion stroke and exhaust stroke.

* * * * *